(12) United States Patent
Ramaswamy et al.

(10) Patent No.: US 10,169,355 B2
(45) Date of Patent: Jan. 1, 2019

(54) KNOWLEDGE REPRESENTATION IN A MULTI-LAYERED DATABASE

(71) Applicant: TATA CONSULTANCY SERVICES LIMITED, MumBai (IN)

(72) Inventors: Satyanarayan Ramaswamy, Santa Clara, CA (US); Viju Chacko, Kochi (IN); Ravi Padmaraj, Kochi (IN); Shampa Sarkar, Mumbai (IN)

( * ) Notice: Subject to any disclaimer, the term of this patent is extended or adjusted under 35 U.S.C. 154(b) by 678 days.

(21) Appl. No.: 14/635,770

(22) Filed: Mar. 2, 2015

(65) Prior Publication Data
US 2016/0117322 A1   Apr. 28, 2016

(30) Foreign Application Priority Data
Oct. 27, 2014   (IN) .......................... 3400/MUM/2014

(51) Int. Cl.
*G06F 17/30* (2006.01)
*G06F 21/62* (2013.01)
*G06F 7/00* (2006.01)

(52) U.S. Cl.
CPC .... *G06F 17/3012* (2013.01); *G06F 17/30106* (2013.01); *G06F 17/30129* (2013.01); *G06F 17/30312* (2013.01); *G06F 17/30864* (2013.01); *G06F 17/30958* (2013.01); *G06F 21/6218* (2013.01)

(58) Field of Classification Search
None
See application file for complete search history.

(56) References Cited

U.S. PATENT DOCUMENTS 5,550,971 A * 8/1996 Brunner .............. G06F 17/3048
6,735,593 B1 * 5/2004 Williams .......... G06F 17/30604
7,483,882 B1 * 1/2009 Bumgarner ....... G06F 17/30286
(Continued)

OTHER PUBLICATIONS

Angles et al., "Survey of Graph Database Models," ACM Computing Surveys, vol. 40, No. 1, Article 1, Publication date: Feb. 2008, 39 pages.
(Continued)

*Primary Examiner* — David T. Brooks
(74) *Attorney, Agent, or Firm* — Seed IP Law Group LLP

(57) ABSTRACT

Knowledge representation in a multi-layered database includes systems and methods for storing and retrieving data in the multi-layered database. The multi-layered database includes an object database layer that stores objects corresponding to real world entities and each object is associated with object properties, object relationships, and relationship properties. Underlying the object database layer is a graph database layer that stores nodes, node properties associated with the nodes, edges, and edge properties associated with the edges, wherein the nodes correspond to objects, node properties are indicative of the object properties, the edges are indicative of the object relationships, and the edge properties are indicative of the relationship properties of the object. Further, underlying the graph database layer is a backend database layer that stores corresponding data and metadata. Data can be stored and retrieved from the multi-layered database by composing and decomposing information between layers.

36 Claims, 20 Drawing Sheets

(56) References Cited

U.S. PATENT DOCUMENTS

| | | | |
|---|---|---|---|
| 8,640,086 B2* | 1/2014 | Bonev | G06F 9/4443 717/105 |
| 8,674,993 B1 | 3/2014 | Fleming et al. | |
| 8,982,129 B1* | 3/2015 | Broekhuijsen | G06F 17/30958 345/440 |
| 2004/0059812 A1* | 3/2004 | Assa | G06F 17/30289 709/224 |
| 2006/0004851 A1* | 1/2006 | Gold | G06F 17/3056 |
| 2006/0150169 A1* | 7/2006 | Cook | G06F 8/10 717/156 |
| 2007/0211056 A1* | 9/2007 | Chakraborty | G06T 11/206 345/440 |
| 2008/0126397 A1* | 5/2008 | Alexander | G06F 17/30595 |
| 2008/0243770 A1* | 10/2008 | Aasman | G06F 17/30587 |
| 2009/0024590 A1* | 1/2009 | Sturge | G06F 17/30893 |
| 2010/0241644 A1* | 9/2010 | Jackson | G06F 17/30392 707/760 |
| 2010/0306272 A1* | 12/2010 | Williamson | G06F 17/30589 707/802 |
| 2013/0246328 A1* | 9/2013 | Sweeney | G06N 7/005 706/50 |
| 2014/0172914 A1* | 6/2014 | Elnikety | G06F 17/30979 707/774 |
| 2014/0201234 A1* | 7/2014 | Lee | G06F 17/30964 707/769 |
| 2015/0142836 A1* | 5/2015 | Borges | G06F 17/30569 707/756 |
| 2015/0254289 A1* | 9/2015 | Junkergard | G06F 17/30592 707/738 |
| 2016/0005197 A1* | 1/2016 | Walker | G06F 17/30569 345/440 |

OTHER PUBLICATIONS

Gyssens et al., "A Graph-Oriented Object Model for Database End-User Interfaces," ACM, pp. 24-33, 1990.

* cited by examiner

KNOWLEDGE REPRESENTATION IN A MULTI-LAYERED DATABASE

TECHNICAL FIELD

The present subject matter relates, in general, to systems and methods for knowledge representation, and in particular to a system and method for knowledge representation in a multi-layered database.

BACKGROUND

Knowledge is defined as the information about a domain that can be queried and used to solve problems in that domain. Knowledge can be represented by a representation scheme to form an Artificial Intelligence (AI) system. In other words, the representation scheme may be understood as the manner in which knowledge is handled to solve problems in a particular domain. Several organizations are involved in modeling knowledge representation techniques in Artificial Intelligence (AI) for several technology domains. For example, knowledge representation may be used in healthcare management, hospitality, transport, integrated circuit design, computer architecture design, social network systems, and the like. Such knowledge representation (KR) techniques can be considered as core component of knowledge management for an enterprise.

Nowadays, some of these knowledge representation techniques are modeled using graph databases due to their capability of storing an enormous volume of large, dynamic, and sparse datasets. Generally, the graph databases are modeled using graph structures to represent and store datasets. The graph structures conveniently encode diverse relations for information retrieval, by virtue of its inherent connectedness. The graph structures include nodes and edges. The nodes represent entities and the edges represent relationships among the entities. Further, the graph structures can be encoded, traversed, partitioned, colored, and clustered, based on the real-world use case scenarios and solutions for knowledge representation and knowledge management.

Each node and edge can have several properties associated therewith for storing attributes of the node and edge. These properties can further be attached to each node and edge as key-value pairs. These properties facilitate in information retrieval from the graph database by means of indexed search based on these stored properties. Further, information retrieval can also be performed by means of graph traversal.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DESCRIPTION OF EMBODIMENTS

Figure 1:
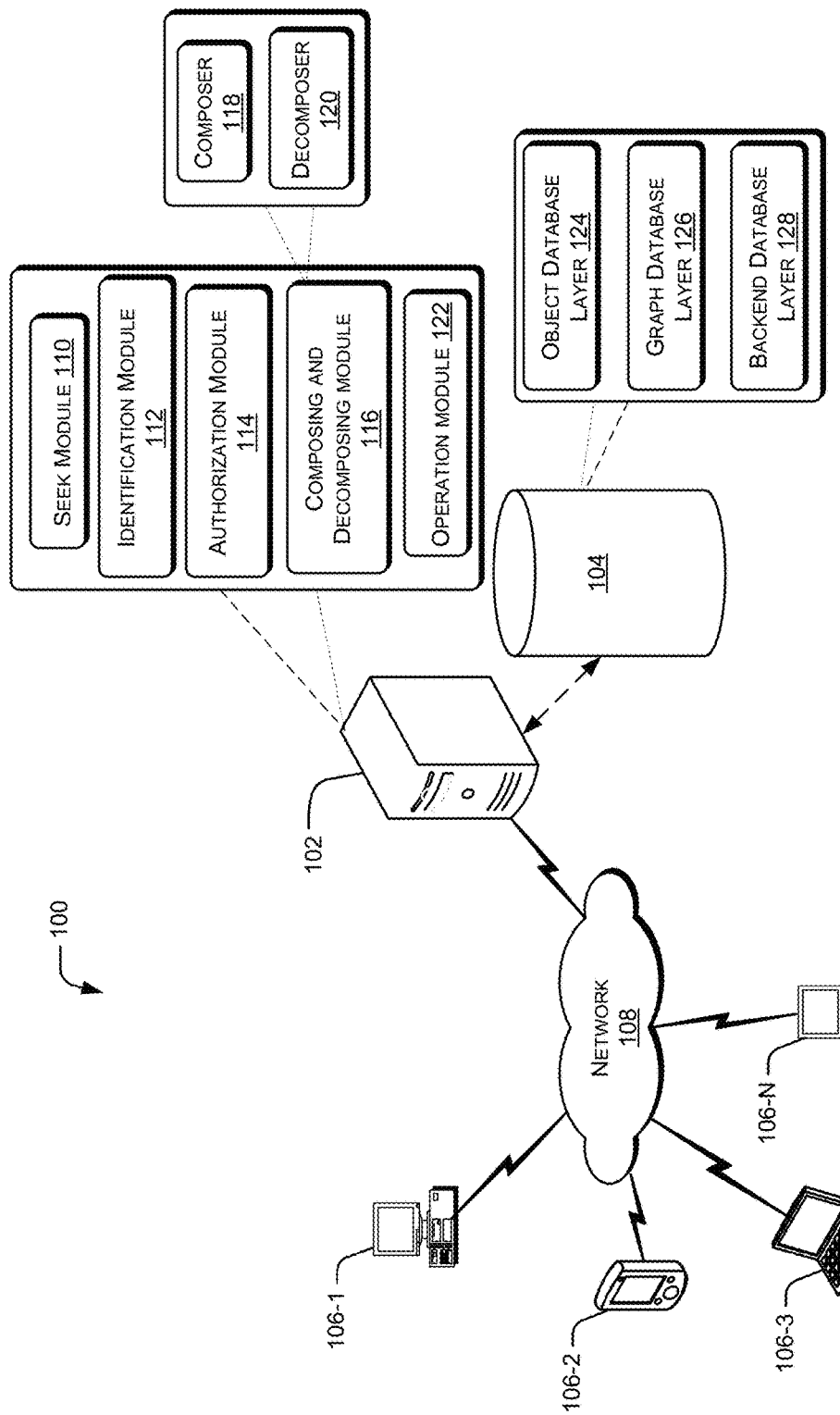
FIG. 1 illustrates a computing environment implementing a system for knowledge representation in a multi-layered database, in accordance with an implementation of the present subject matter.

Typically, knowledge representation deals with a large size/amount of data to be stored, retrieved, and analyzed.

This large amount of data may include data, metadata, and the relationships between the data, along with rules and applicability of the data, metadata and the relationships. Managing and processing of such large amounts of data can be challenging because the large amount of data causes a high I/O latency. For reducing the I/O latency, several modeling techniques, such as rule based knowledge representation and frame knowledge representation have been employed. Knowledge representations modeled by such modeling techniques encounter scalability challenges while storing or retrieving a large amount of data and involve intense computations which lead to non-linear performance scaling when associated databases are scaled. In some other techniques, a graphical representation may be employed for knowledge representation. The graphical representation includes nodes and edges to represent entities and relationships between the entities. The graphical representation may be employed using properties of nodes and edges, for storing or retrieving information. Retrieval of information from databases modeled using such techniques consumes time and is slow. For retrieving information, a query is executed. For query execution, generally, various nodes of the graphical representation have to be traversed to retrieve related information, which is a time consuming process.

Further, in today's world, the amount of data managed by databases increases tremendously in volume with time, with additional challenges brought in by varieties of data and velocity with which the data flows/changes. With the Big data technologies, storing large volume of data which can further be unstructured or semi-structured in nature and which has real-time to near real-time data flow becomes possible. But querying and retrieving information poses a challenge. Towards this direction, Graph databases and Knowledge representation using Graph databases have been developed, which can manage sparsely in data and wherein complex queries can be retrieved by graph traversal. In a typical Graph, every node/edge has properties associated with it as key-value (k, v) pairs. The properties are associated with nodes/edges data elements which are further indexed for facilitating seek and query retrieval. While, Graph is a flexible and expandable schema for storage, the index for the properties would have to be maintained in a manner optimal for query retrieval, thus losing the flexibility and expandability/scalability of the schema.

Systems and methods of the present subject matter allow for knowledge representation in an efficient, flexible, and extensible manner using an object oriented graph database (O2GDB) representation over a graph database layer. As used herein, knowledge representation may include storing, retrieving, and manipulation of information. O2GDB is also interchangeably referred to as object database layer herein. The O2GDB provides a flexible and expandable semantic layer on the top of graph layer. An object in O2GDB layer represents a real world entity and has one-to-one correspondence with a node in the graph layer. Further, the objects in the O2GDB layer are interrelated by object relationships that correspond to edges in the graph layer. Thus changes in the properties or relationships of the object will be accommodated by the underlying graph layer by corresponding modification of the nodes/edges properties. The objects and relationships, however, can incorporate additional intelligence, such as inheritance, constituent relationships, inference of relationships, etc., in a concise form thus providing greater flexibility in manipulating information than the graph layer where the additional intelligence is present in the decomposed form and is therefore more complex to manipulate. Various database operations, such as create, read, update, and delete operations, happen at O2GDB layer and get incorporated in the underlying layers based on the additional intelligence that is provided in O2GDB layer.

Further, the object oriented graph database does not follow an ontology based approach or a template based approach for a knowledge representation. The ontology based approach tends to be hierarchical in nature, where the nodes are stored and represented with a certain predefined hierarchy or class/type, thereby limit the flexibility of the schema. Rather, each object along with its relations is presented as an instance and can be manipulated independently, which adds to the flexibility in data storage and retrieval as discussed later.

The knowledge representation systems and methods as per the present subject matter can be implemented, for example, to store data related to a firm, such as employee data including name, date of birth, salary, designation, and operations and projects data and the like. In other examples, the knowledge representation systems and methods may be implemented for various sectors, such as healthcare management, hospitality, transport, integrated circuit design, computer architecture design, a social network system, and the like. In yet another implementation, the knowledge representation system may include data related to multiple different entities and domains, such as data obtained from the Internet or from the Internet of things. Accordingly, the information in the O2GDB layer may be interrelated such as, information of employees of an organization, information related to a hospital, information related to transportation, and the like, or may be independent to each other, for example, information related to various different domains. The additional intelligence in the O2GDB layer is incorporated into the underlying layers, i.e., the graph layer and the database layer, as decomposed information. However, the underlying layers by themselves are generally complex to manipulate, while the O2GDB layer provides an intuitive way of knowledge representation for data manipulation, such as, storage, retrieval, and modification of the data.

In one implementation, the knowledge representation is performed using a multi-layered database. In an implementation, the multi-layered database may be a three layered database, which includes an object database layer, a graph database layer, and a backend database layer. For storing data in the multi-layered database, the data may be represented as objects in the object database layer and decomposed in multiple stages into the data and metadata stored in the backend database layer.

The object database layer can include real world entities represented as objects to provide an object-oriented database layer. The real world entities may be understood as the entities that exist in real world. In an example, the real world entities may be in the form of names of the person such as, John, Peter, Michael, and the like. In another example, real world entities may be designations of employees such as, manager, associate, senior manager, producer, and the like. In one more example, the real world entities may be any real world objects such as, houses, refrigerators, laptops, books, and the like. These examples of real world entities are non-limiting examples provided for illustration. It will be appreciated that the real world entities can include any entity existing in the real world. Each of the real world entities may be associated with their respective attributes. The attributes include properties of the objects representing the real world entities and relationships among the objects. In one example, each relationship connecting one object to another object can be directional in nature. Further, each object and relationship can include respective object properties and relationship properties. In one example, the objects may be indexed for subsequent search and retrieval. The object database layer facilitates in extension of the multilayered database, thereby providing flexibility to the multi-layered database. In one implementation, extension can be facilitated by defining inheritance relationship to all the entities.

The graph database layer is created based on the object database layer and is underlying the object database layer. The graph database layer includes nodes and edges connecting these nodes. Each of the nodes and edges are associated with their respective properties as key-value pairs. The nodes, the edges, and the node properties and edge properties are created by decomposing the objects and relationships of the object database layer into the graph database layer. The properties associated with the nodes indicate the properties of the objects corresponding to the nodes and the edges indicate the relationships among the objects. The graph database layer is scalable due to the presence of the object database layer. The object database layer facilitates adding new entities to the graph database layer via Application Programming Interfaces (APIs) exposed by the graph database layer and the object database layer, without affecting other nodes and edges of the graph database layer.

Further, the backend database layer is created based on the graph database layer. The backend database layer includes data and metadata corresponding to the nodes, the edges, and the properties associated with the nodes and the edges of the graph database layer. In one implementation, the backend database layer can be a columnar database to store a large volume of data in the order of at least terabyte. The data can further be sparse in nature. The backend database can further manipulate data in real-time. In another implementation, the backend database layer can store and manipulate a large sized data such as, data in terabyte, petabyte, and the like. In one implementation, the layered database can include storage mechanisms, such as HBase or Cassandra, for Big Bata operations vis-a-vis File for small scale data operations, based on the Enterprise requirements or user configurations. Hence, the multi-layered database can be considered as pluggable storage service architecture with adaptability to toggle between different storage mechanisms.

For storing data using a knowledge representation scheme in the multi-layered database, attributes of a real world entity may be received for storage in the multi-layered database, wherein the attributes characterize properties and relationships of the real world entity. An object corresponding to the real world entity may be stored in an object database layer of the multi-layered database, wherein, based on the attributes of the real world entity, the object is associated with object properties that characterize the object, at least one object relationship that relates the object to at least one other object, and relationship properties that characterize the object relationship. The object, the object properties, the object relationship, and the relationship properties may be then decomposed into a node, node properties associated with the node, at least one edge, and edge properties associated with the edge, wherein the node properties are indicative of the object properties, the edge is indicative of the object relationship, and the edge properties are indicative of the relationship properties of the object. The node, the node properties, the edge, and the edge properties may be stored in a graph database layer of the multi-layered database, wherein the edge connects the node with at least one other node corresponding to the at least one other object. The node, the node properties, the edge, and the edge properties may be further decomposed into the data and metadata associated with the data. The data and the metadata may be then stored in a backend database layer of the multi-layered database.

For retrieval of data from the multi-layered database, a query may be provided by a user and executed in the multi-layered database. The user may refer to a person who seeks the information to be retrieved from the multi-layered database. For retrieving the information, the query is received from the user to identify objects corresponding to which the information is to be retrieved. After identifying the objects, access privilege for the user is determined. The access privilege may be understood as rights to a user to access the objects. In other words, access privilege defines whether the user has rights to access the objects or not. When the user is privileged to access the objects, the information corresponding to the objects is retrieved from the backend database layer and is composed. The information is composed to provide structured information corresponding to the objects. For retrieving the information corresponding to identify objects, the graph database is traversed to identify the nodes corresponding to the identified objects, edges corresponding to object relationships, and the properties associated with the nodes and the edges. After this, data and metadata corresponding to the identified nodes and edges are retrieved from the backend database layer. The data and metadata are retrieved to compose the objects for providing the information to the user.

Thus, the present subject matter provides for scalable and flexible multi-layered database. The methods and systems of present subject matter are further described in conjunction with the following figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

FIG. 1 illustrates a computing environment 100 implementing a system 102 for knowledge representation in a multi-layered database 104, in accordance with an implementation of the present subject matter. The system 102 can be implemented to store a large amount of data in the multi-layered database 104, such that the large amount of data, for example, real world entities are represented as objects, in order to facilitate retrieval of the large amount of data by a user. The system 102 can be implemented in a computing device, such as a server, a desktop, a laptop, a personal digital assistant, a smart phone, or the like.

The system 102 may be coupled to one or more computing devices 106-1, 106-2, . . . , 106-N via a network 108. The computing devices 106-1, 106-2, . . . , 106-N may hereinafter be collectively referred to as computing devices 106, and individually referred to as a computing device 106. The computing devices 106 may include, but are not restricted to, servers, desktops, laptops, personal digital assistants, smart phones, and the like. The network 108 may be a wireless network, wired network, or a combination thereof. The network 108 can be implemented as any of different types of networks, such as intranet, local area network (LAN), wide area network (WAN), the internet, and their combination. The network 108 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

Accordingly, system 102 can include a seek module 110, an identification module 112, an authorization module 114, a composer 118, an operation module 122, and a decomposer 120. In one implementation, the composer 118 and the decomposer 120 in combination form a composing and decomposing module 116. Further, the system 102 can communicate with the multi-layered database 104, either directly or over the network 108. The multi-layered database 104 can be a single database or multiple databases, which may either be co-located or distributed. Further, the multi-layered database 104 can include multiple layers of databases. Each of the layers of databases can be understood as a single database or multiple databases, which may be either co-located or distributed. In one example, the multi-layered database 104 can include three layers, i.e., an object database layer 124, a graph database layer 126, and a backend database layer 128. In one example, the backend database layer 128 can provide for scalable data storage through one or more of HDFS, HBASE, RDBMS, or other types of databases and file systems. In one of the embodiments, one or more layers of the multilayer database may further be hosted over cloud.

In one example, the backend database layer 128 includes both data and metadata. The backend database layer 128 can be designed to scale for large volumes of data, for example, using various big data techniques based on Apache Hadoop ecosystem for content data storage and data mining. Accordingly, the backend database can also store large volumes of data spread across clusters of servers. In other examples, small scale data and metadata can be stored in traditional relational databases or local file systems.

In operation, the multi-layered database 104 can first be created or deployed. For creating the multi-layered database 104, a user or a developer can send an input to the operation module 122. The input can include, for example, bulk information related to multiple real world entities and their attributes. Bulk information can refer to, for example, a file or folder comprising information related to a plurality of real world entities in a format usable to upload the information into the multi-layered database 104. Each of the real world entities may be associated with their respective attributes including properties of the real world entities and information indicating how the various real world entities are interrelated.

Upon receiving the input, the operation module 122 can create an object database layer 124. The object database layer 124 includes the real world entities represented as objects, relationships, object properties and relationship properties. The real world entities may be understood as the entities that exist in real world. In an example, the real world entities may be in the form of names of the person such as, John, Peter, and Michael. In another example, real world entities may be designations of employees such as, manager, associate, senior manager, and producer. In one more example, the real world entities may be any real world objects such as, houses, refrigerators, laptops, books. These examples of real world entities are non-limiting examples provided for illustration. It will be appreciated that the real world entities can include any entity existing in the real world.

The operation module 122 can then create a graph database layer 126 based on the object database layer 124. The graph database layer 126 stores the information of the object database layer 124 in graphical form. For this, the objects in the object database layer 124 are decomposed, by the decomposer 120, into nodes, node properties, edges, and edge properties. Each node may be understood as a data node which contains data related to an object. The nodes are associated with the properties; the properties indicate the properties of the objects. And, the nodes are connected through the edges; the edges indicate the relationships among the objects. Each object in the object database layer 124 has a one-to-one mapping with its corresponding node in the graph database layer 126. For decomposing the object into the node, the data and properties of the object are stored as (key, value) pairs of the node.

The operation module 122 can further create a backend database layer 128. The backend database layer 128 can be created based on the graph database layer 126. The backend database layer 128 can store data and metadata corresponding to the (key, value) pairs associated with the nodes of the graph database layer 126. The backend database layer 128 can further store the properties associated with the nodes and the properties associated with the edges as data and metadata, for example, using a BigData storage mechanism such as Hadoop.

Further, each of the nodes and their respective key, value pairs can be indexed for faster search and retrieval. In one implementation, for indexing, the nodes can be assigned with indices such as, Lucene indices. In another implementation, for indexing, the nodes can be assigned with customized indices. The multilayer database architecture thus provides a pluggable index-service architecture, wherein the ability to plug different types of indexing service based on the Enterprise or user requirements. Each of the indices for objects and properties can be stored in tables.

In one example, for indexing, several tables such as, a document table, an index table, and an index datatype table, can be created. The document table includes information, in the form of document, corresponding to the nodes. The index table includes indices, such as key-value pair, assigned to the nodes. The index datatype table includes information pertaining to the type of indices, i.e., whether the indices are in the form of integer, strings, images, or the like. The index datatype table ensures that the indices stored to an index table are of same type. For example, an index is assigned to a value, i.e., age of an entity represented as a node; the datatype in this case is integer. Thus, the index datatype table ensures that only integer data would be stored for age of the entity. Use of these tables facilitate graph traversal of the graph database layer 126, while retrieving the information corresponding to an object In operation, the seek module 110 can generate a Graphical User Interface (GUI) for receiving a query from a user to retrieve information of objects from the multi-layered database 104. The information of objects includes data and metadata associated with the objects. In an implementation, the seek module 110 can be coupled to a cache mechanism for retrieving the information which is frequently accessed. Further, an indexing architecture maybe created between the graph layer and the backend data storage as discussed above and can be used by the cache mechanism. In another example, the indexing infrastructure can be created by constructing a query parser along with tables for storing indices. In another example, the indexing mechanism can be based on a Lucene like index layer which includes index storage. For example, when the required sub-graph of the object database layer 124 and the graph layer 126 are brought on in-memory cache, an indexing module (not shown in this figure) may generate a Reference ID to the cache layer objects and nodes, which can tag or connect the objects and nodes with data and metadata in the backend storage. Sub-graph can be understood as the graph comprising the nodes and edges and/or objects and relationships currently active in the system. The indexing infrastructure can be based on an index layer. In another implementation, the seek module can seek data and information related the query based on a non-indexed seek or search. Such seek may further be done by traversing the entire database for query retrieval.

Based on the data or the metadata, the identification module 112 can identify the objects for which information is to be retrieved. In one implementation, the identification module 112 can identify the object based on the indices in the indexing infrastructure. In another embodiment, the identification module can identify the object based on properties associated with the retrieved object with respect to the query.

After identifying the objects, access authorization of the user to the information associated with the objects is checked. For this, the authorization module 114 can check for access privileges of the user based on authorization credentials of the user. For example, the authorization credentials can be ID number and password. In one implementation, the authorization module 114 includes a field for entering authorization credentials by the user to check whether the user is privileged to access the information associated with the object identified by the identification module 112. The authorization module 114 restricts the access of the information associated with the objects by the user if the user is not privileged to access the objects. However, if the user is privileged to access the information associated with the objects the authorization module 114 provides access to the information associated with the objects to the user. In one implementation, the privilege is based on role-based security features. For example, an enterprise level encryption standard may be implemented on a predefined property dataset for defining security of accessing the information associated with the objects.

Further, when the user is privileged to access the information associated with the objects, the composer 118 can retrieve the information corresponding to the objects from the backend database layer 128. For retrieving the information, the composer 118 composes or reads the nodes of the graph database after selecting the nodes which are associated with the objects identified as being relevant to the information being searched by the query of the user or the developer. As a result, the graph database need not be traversed to determine from which nodes is the information to be retrieved, and so execution time of the composer 118 can be reduced as compared to conventional graph databases. Thereby, the system and the method of the present subject matter are efficient and fast. In one implementation, the operation module 122 can retrieve the data and metadata present in a backend database layer corresponding to the selected nodes. Based on the retrieved information, the composer 118 creates and presents the objects corresponding to the information to the user. In another implementation, the operation module 122 can present the objects on the display 812 by highlighting the objects corresponding to the retrieved information.

Figure 2:
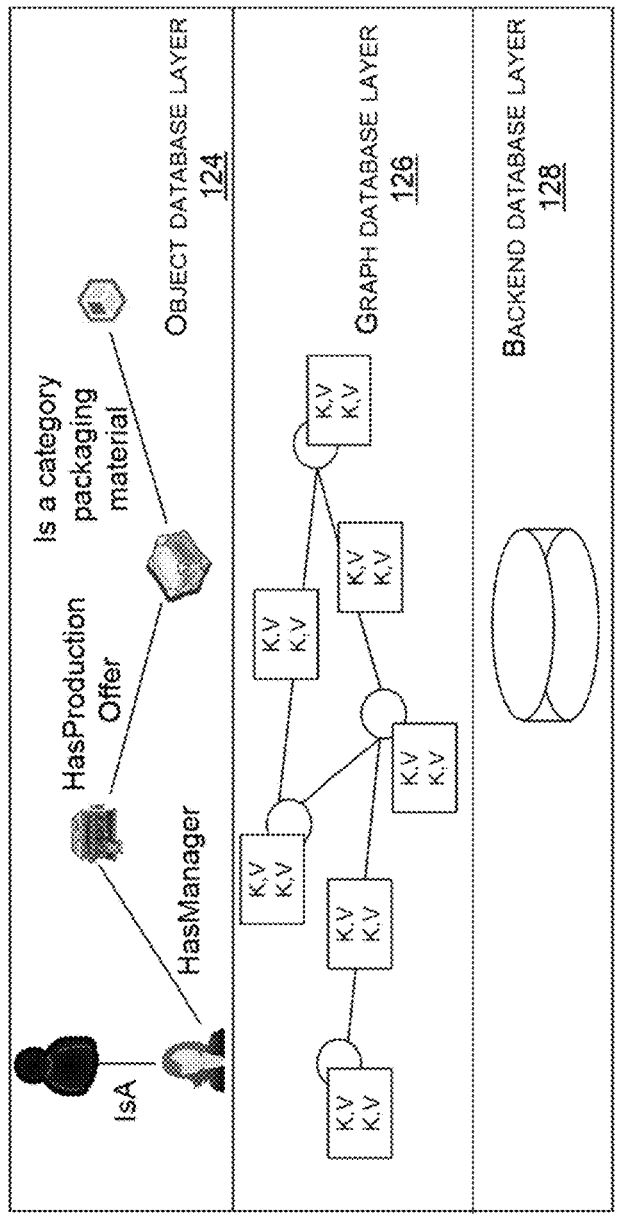
FIG. 2 illustrates mapping of object database layer and graph database layer, in accordance with an implementation of the present subject matter.

Referring now to FIG. 2, which illustrates mapping of object database layer 124 and graph database layer 126. In other words, FIG. 2 illustrates how real world entities represented as objects in the object database layer 124 are mapped with the nodes in the graph database layer 126. Each of the objects in the object database layer 124 is associated with their respective properties, relationships, and relationship properties. Further, in the graph database layer 126, the objects are stored as nodes and relationships are stored as edges. Thus the nodes are connected through the edges representing relationship among the nodes. The nodes and edges have respective properties stored as key value pairs. The object can be one of a general object, a system object, and a literal object, and the node can be correspondingly one of an object node, a system node, and a literal node, as described herein later in this specification.

The inter-relationship between objects can be of several types such as, a parent-child relationship or inheritance, a constituent relationship, and a general relationship. In the parent-child relationship or inheritance, one object can be represented as a parent object and the related object as a child object. The child object inherits properties including constituent relationships and general relationships from the parent object of which the properties are known. Also, any additions or updates on the parent object can be applicable to its child object. Further, the child object can decide to add, modify, or override, one or more properties of the corresponding parent object to provide specialized properties. Further, the child object can inherit constituent relationships of its corresponding parent object, and can also override the constituent relationship for adding a specialization to the constituent relationships of the corresponding parent object for the child object.

In the constituent relationship, one object is constituted of or includes one or more constituent objects, and thus, corresponding node is also constituted of other nodes in the graph database layer 126. The constituent relationship can facilitate in defining "has *" relationships among the nodes. For example, an object "shopping cart" can have constituent relationship with an object 'purchase item'.

The general relationship can include a general association with another object, which can be user defined. For example, general relationship can further include a dummy relationship between the parent object and the child object.

Figure 3:
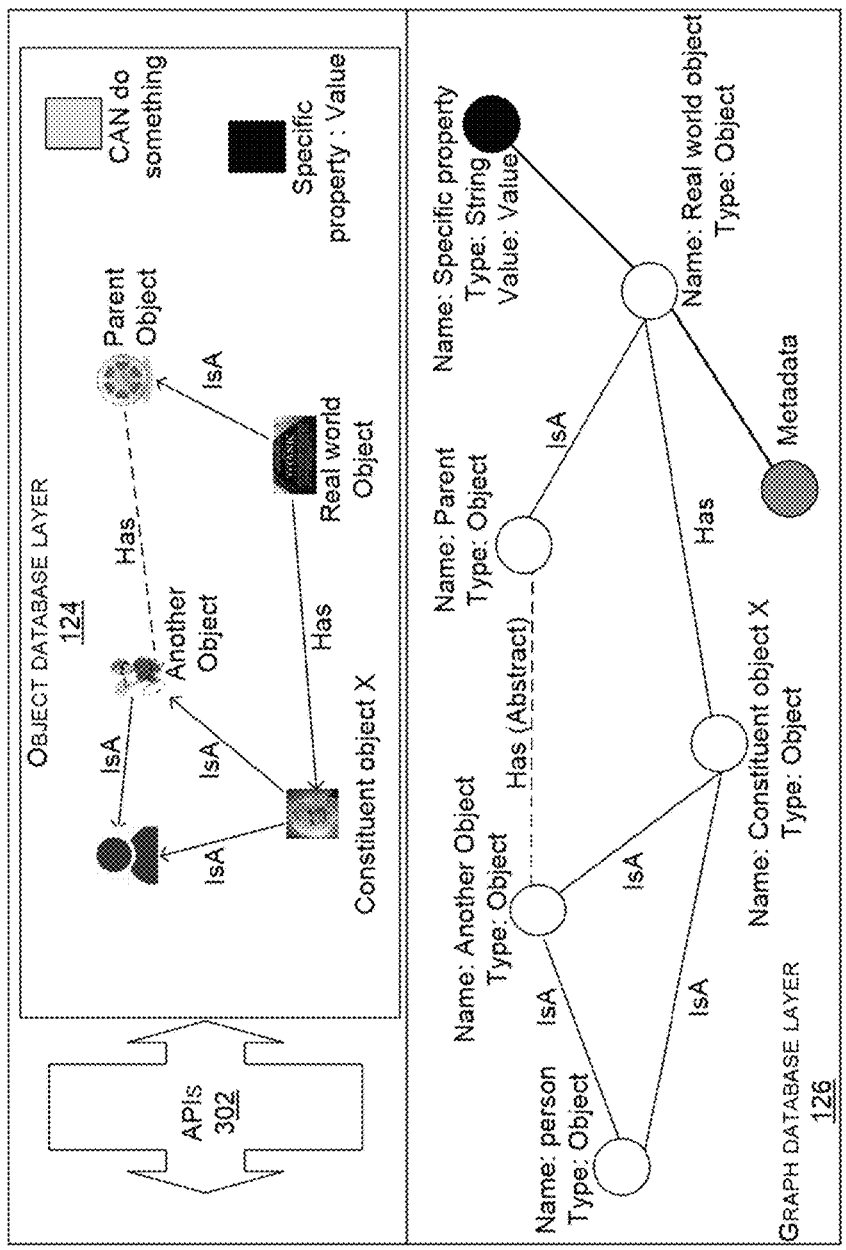
FIG. 3 illustrates how an object is accessible from object database layer, in accordance with an implementation of the present subject matter.

FIG. 3 illustrates how an object is accessible from object database layer 124. It will be understood that the nodes and edges in the graph database layer 126 have the information stored as key-value pairs, even when not specifically shown, for example in this and some of the other figures, for simplicity.

For accessing the object, the Application Programming Interface(s) (APIs) 302 can be used. The APIs 302 can be used for developing an application, such as a website, to access the objects from the object database layer 124. The APIs 302 allows a user to input command for performing several functions such as, creating the objects on the object database layer 124, retrieving information corresponding to objects from the backend database layer 128, and updating information corresponding to objects, and deleting objects from the object database layer 124. In an example, as illustrated in FIG. 3, the object database layer 124 and the graph database layer 126 are created using APIs 302. In this example, the graph database layer 126 can include object nodes corresponding to general objects representing respective real world entities. The graph database layer 126 can also include literal nodes corresponding to literal objects for facilitating extension of graph database layer 126 and object database layer 124. The literal nodes can be converted into object nodes when literal objects are converted into general objects for extending the graph database layer 126 and object database layer 124. For example, the literal objects and literal nodes can store literal values, such as text, numerical value, etc., and can be later converted into objects or nodes that include the literal values as properties.

Further, the literal objects can be associated with other objects by a relationship, as discussed herein above while explaining FIG. 2. Correspondingly, the literal nodes can be associated with other nodes through edges. The object database layer 124 and the graph database layer 126 can also include system object and corresponding system node for realizing system functions. A system object and corresponding system node may comprise information required for system operations. For instance, the system object and system node may include, but not limited to, the latest accessed timestamp for the object database layer and graph layer database respectively, or a count mentioning the number of times the object database layer and the graph database layer has been accessed respectively, or the like. In another implementation, the system object and system node may comprise information regarding the version status and archiving status pertaining to the respective layers.

Figure 4:
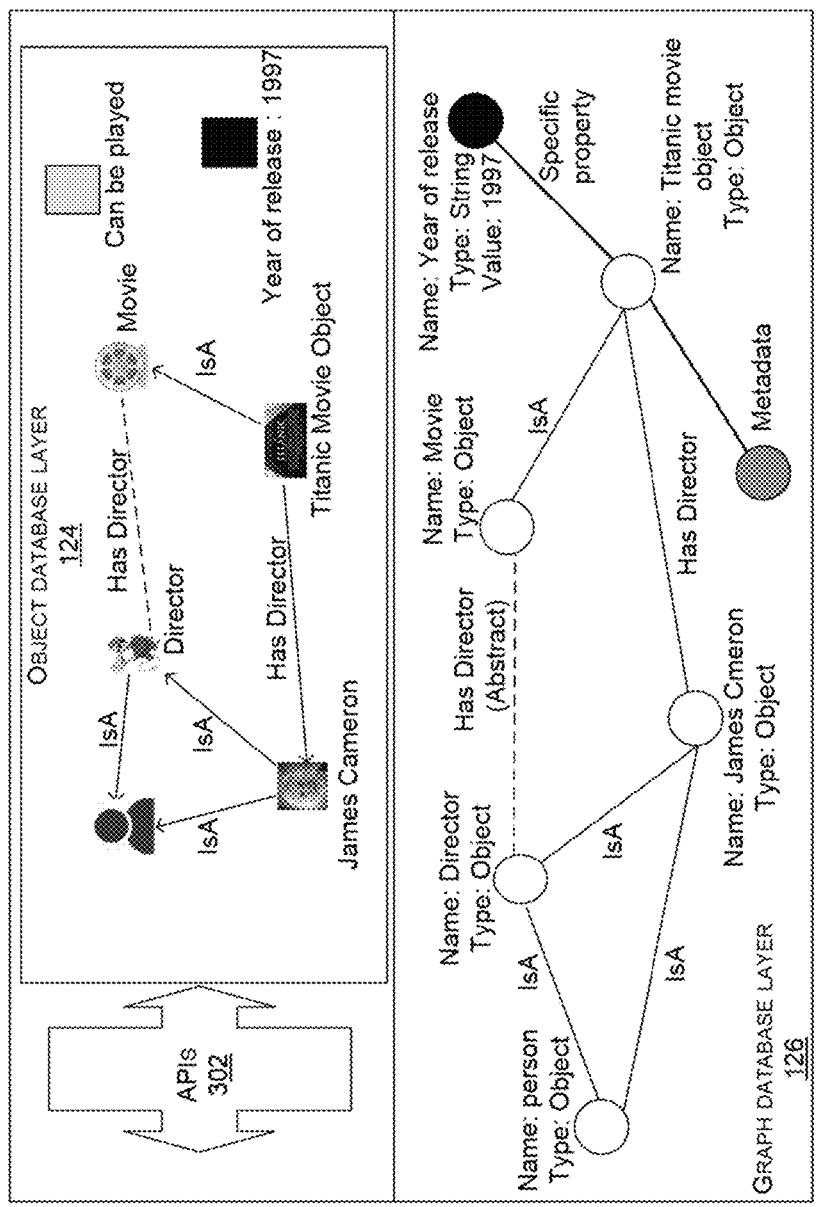
FIG. 4 illustrates an example implementation of mapping between object database layer and graph database layer, in accordance with an implementation of the present subject matter.

FIG. 4 illustrates an example of FIG. 3. Considering this example, object "Titanic movie object" is a movie. Therefore, the object "Titanic movie object" is connected to an object "movie" through a relationship 'isA'. Also, the object "movie" has a director represented by an object "James Cameron". Therefore, relationship between the object "movie" and the object "James Cameron" is represented by 'hasDirector.' Further, "James Cameron" is a "person". Also, "James Cameron" is a "director" who is a "person". Therefore, relationship between the object "James Cameron" and the object "person", relationship between the object "James Cameron" and the object "director", and the relationship between the object "director" and the object "person" are represented by 'isA.' Here, edge or relation 'isA' indicates a parent-child relationship between two objects and edge or relation 'hasDirector' indicates a constituent relationship between two objects.

Now, APIs 302 creates graph database layer 126 based on the object database layer 124. The graph database layer 126 for this example can include several nodes corresponding to the objects, i.e., Titanic movie object, James Cameron, movie, director, and person. These nodes can have name, and can be specified with their types such as, type for name. These nodes are further connected to each other through edges. The edges represent 'isA' or 'has*' relationship among the nodes, wherein the '*' indicates the extension in the constituent relation. The graph database layer 126 can include a system node corresponding to system runtime functionalities. The graph database layer 126 can further include a literal node for extending the graph database layer 126. In this example, the literal node can include several kinds of data such as, data which signifies that in which year the movie is released. The literal node can include literal value such as, 1997 which signifies that the movie Titanic has been released in year 1997.

Figure 5:
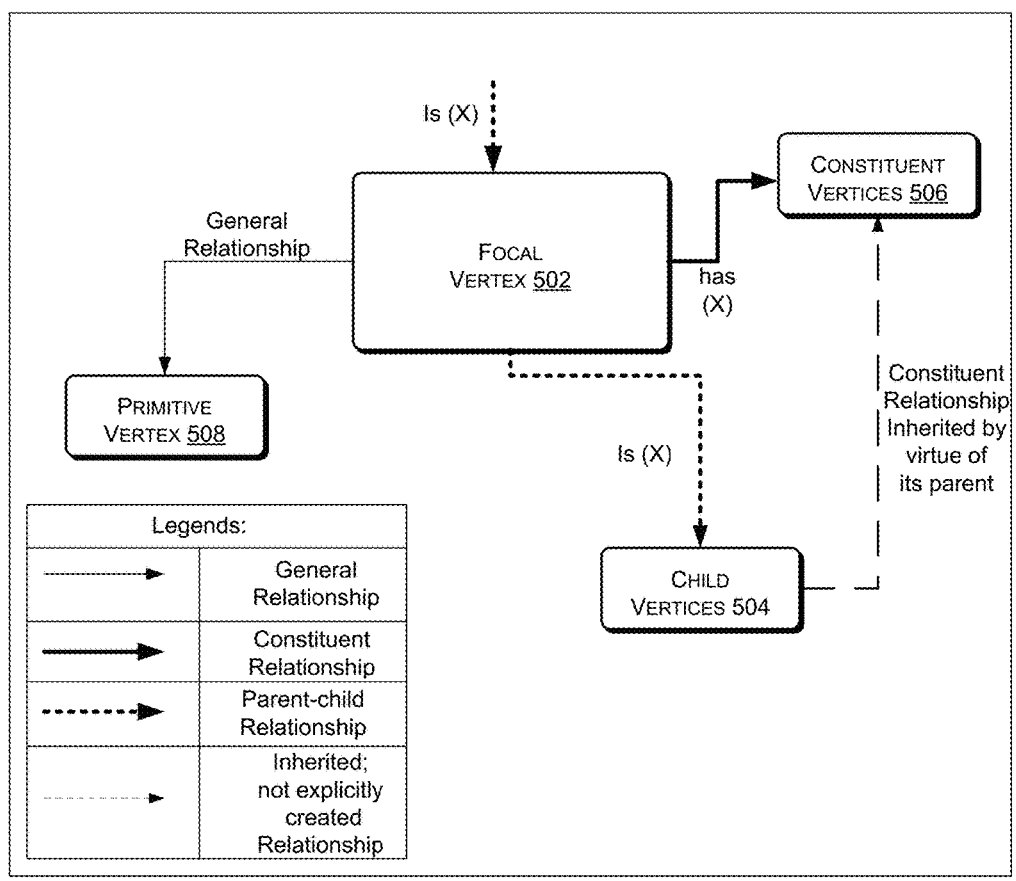
FIGS. 5 and 6 illustrate how relationships between the objects in the object database layer and nodes in the graph database layer are represented and manipulated, in accordance with an implementation of the present subject matter.

FIG. 5 illustrates how relationships between the objects in the object database layer 124 are established. It will be understood that the relationships between underlying nodes in the graph database layer 126 will also be similarly established. A focal vertex 502 can be considered as the parent object. The focal vertex 502 can constitute child vertices 504. The child vertices 504 can be considered as the child objects. Relationship between focal vertex 502 and child vertices 504 can be represented by 'is' relationship. Also, the focal vertex 502 can be constituted of or include constituent vertices 506. Relationship between focal vertex 502 and constituent vertices 504 can be represented by 'has*' relationship. The focal vertex 502 can further be connected to primitive vertex, i.e., primitive object through general relationship. The general relationship can help in defining associations at an object level, wherein such association can be 'like', 'similar' or a dummy relation, and may or may not be inherited by child objects.

Figure 6:
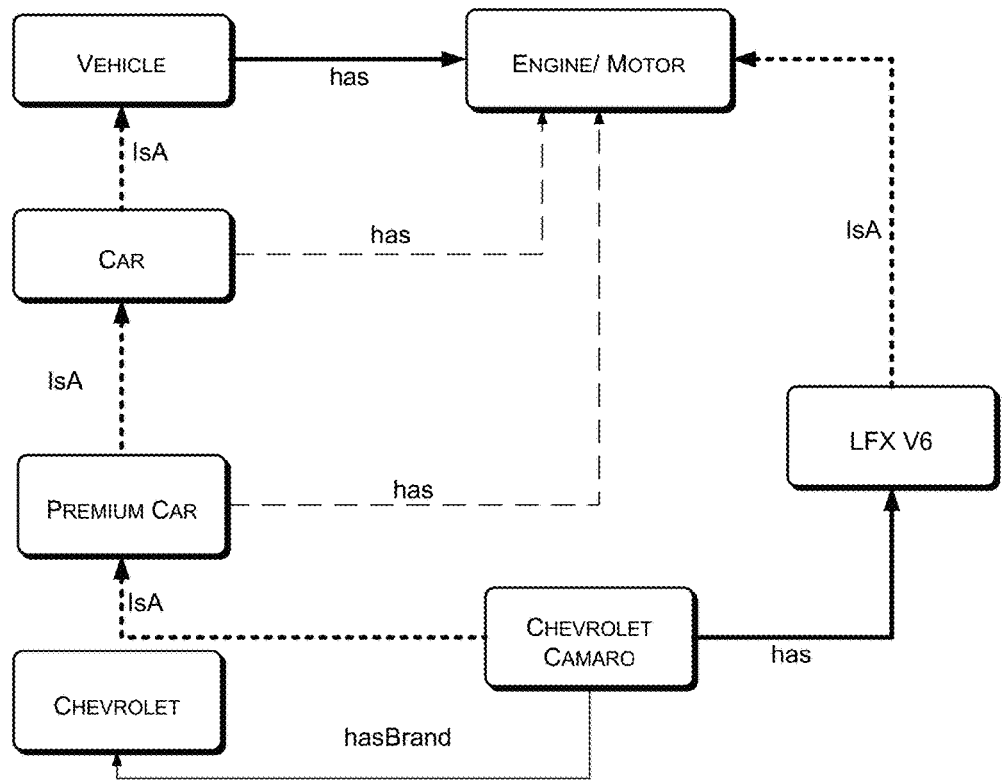

For example, as illustrated in FIG. 6, Vehicle can be considered as focal vertex 502. Vehicle has engine, therefore vehicle is related to engine/motor through constituent relationship which is represented as 'has*.' Also, car is a vehicle; vehicle is focal vertex for car, therefore car and vehicle are related with parent-child relationship which is represented as 'isA.' Further, car has a child vertex represented as premium car. Hence, relationship between the car and premium car is represented as 'isA.' Similarly, parent-child relationship being developed between premium car and Chevrolet CAMERO, Chevrolet Camero and Chevrolet, and engine/motor and LFX V6. In general, every car has an engine. Therefore, every car is constituted of an engine/motor. In other words, the engine/motor is a constituent of car. Therefore, relationship between the car and engine/motor is represented as 'has*.' Similarly, constituent relationship can be developed between vehicle and engine/motor, premium car and engine/motor, and Chevrolet Camaro and LFXV6.

Figure 7A:
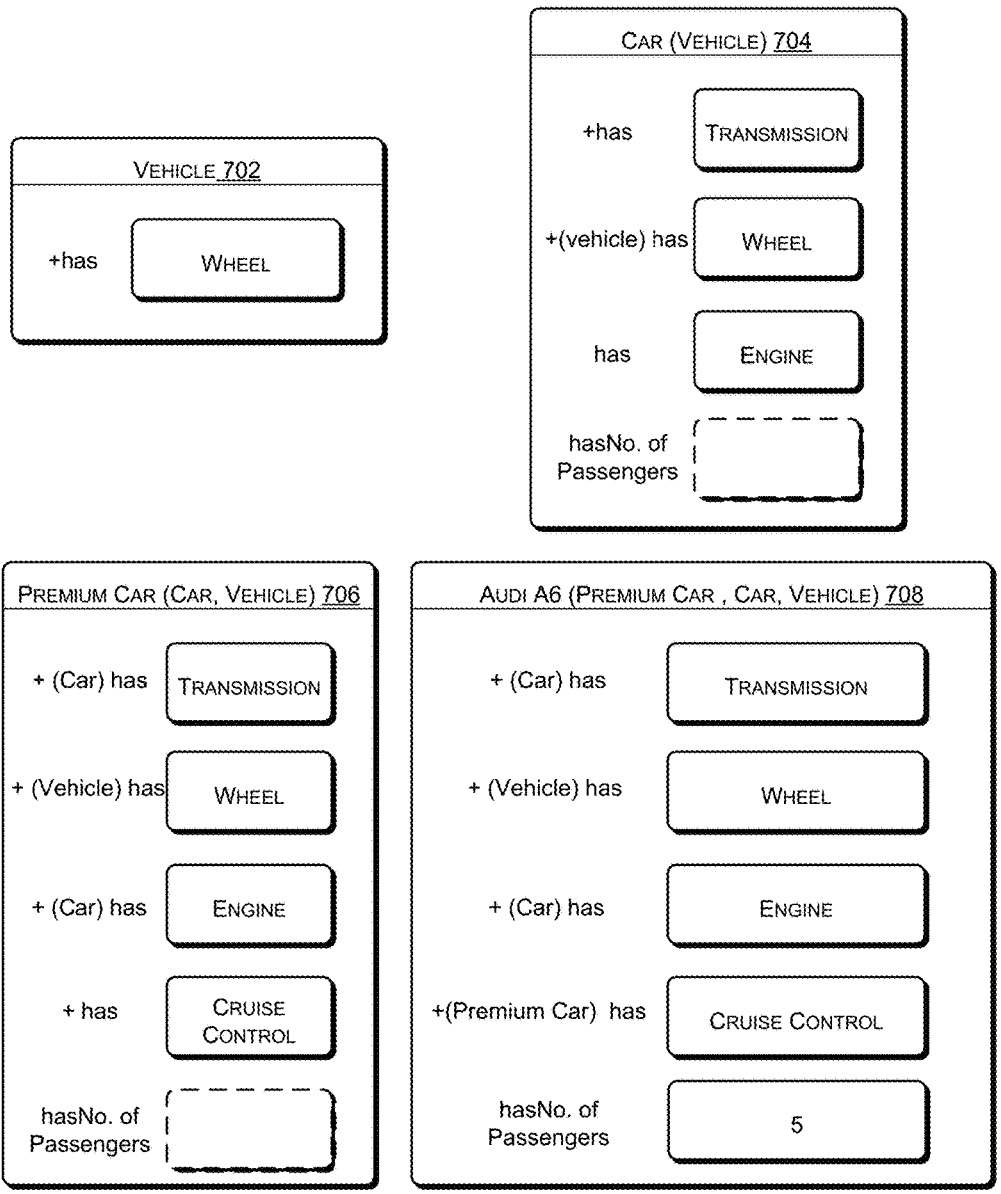
FIG. 7A illustrates how objects can be represented onto the object database layer, in accordance with an implementation of the present subject matter.

FIG. 7A illustrates how objects can be represented and stored in the object database layer 124. The objects can be represented in the object database layer 124 by way of several representations such as, a graphical representation and a grid representation. In general, every vehicle has wheel. Therefore, object "vehicle" is constituted of object "wheel" which is represented as block 702. Further, block 704 illustrates that "car" is a constituent for the object "vehicle". Block 704 further illustrates that the object "car" has constituent objects such as, "transmission", "wheel", and "engine". These constituent objects are related to the object "car" through constituent relationship represented as 'has*.' Furthermore, block 706 illustrates that "premium car" is a child object of the object "car", which is further a child object of the object "vehicle". Block 706 further illustrates that the object "premium car" has constituent objects such as, "transmission", "wheel", "engine", and "cruise control" inherited from the parent object "car". These constituent objects are related to the object "premium car" through constituent relationship represented as 'has*.' Also, block 708 illustrates that "Audi A6™" is a constituent for the object "premium car". Block 708 further illustrates that the object "Audi A6™" has constituent objects such as, "transmission", "wheel", and "engine", which are inherited, and other constituent objects, such as "cruise control", and an integer '5' which is a literal value for a literal object. The literal object here is "number of passengers", which is constituent of the object "Audi A6™". These constituent objects are related to the object "car" through constituent relationship represented as 'has*.' Hence, in this example, object "vehicle" is a parent object which has child objects as "car", "premium car", and "Audi A6™".

Thus, as illustrated, the intelligence regarding object properties and inter-relationships between objects can be stored in a concise and easy to manipulate form in an object. Hence, for example, the properties of the object "wheel" can be defined once and by creating constituent relationships, the object "wheel" can be included into constituted objects, like "vehicle", "car", "premium car", etc. As a result, the properties of the object "wheel" get incorporated into these constituted objects and do not have to be defined separately each time. Further, in case the properties of the object "wheel" have to be modified, it can be done once and need not be done separately in each constituted object. Similarly, the inheritance relationship ensures that the child object inherits the properties and relationships of the parent object without having to explicitly define those properties and relationships again in the child object. Thus, manipulation of the properties and relationships becomes easier as any modification can be done in the parent object and it gets automatically incorporated in the child object by virtue of the inheritance relationship.

Figure 7B:
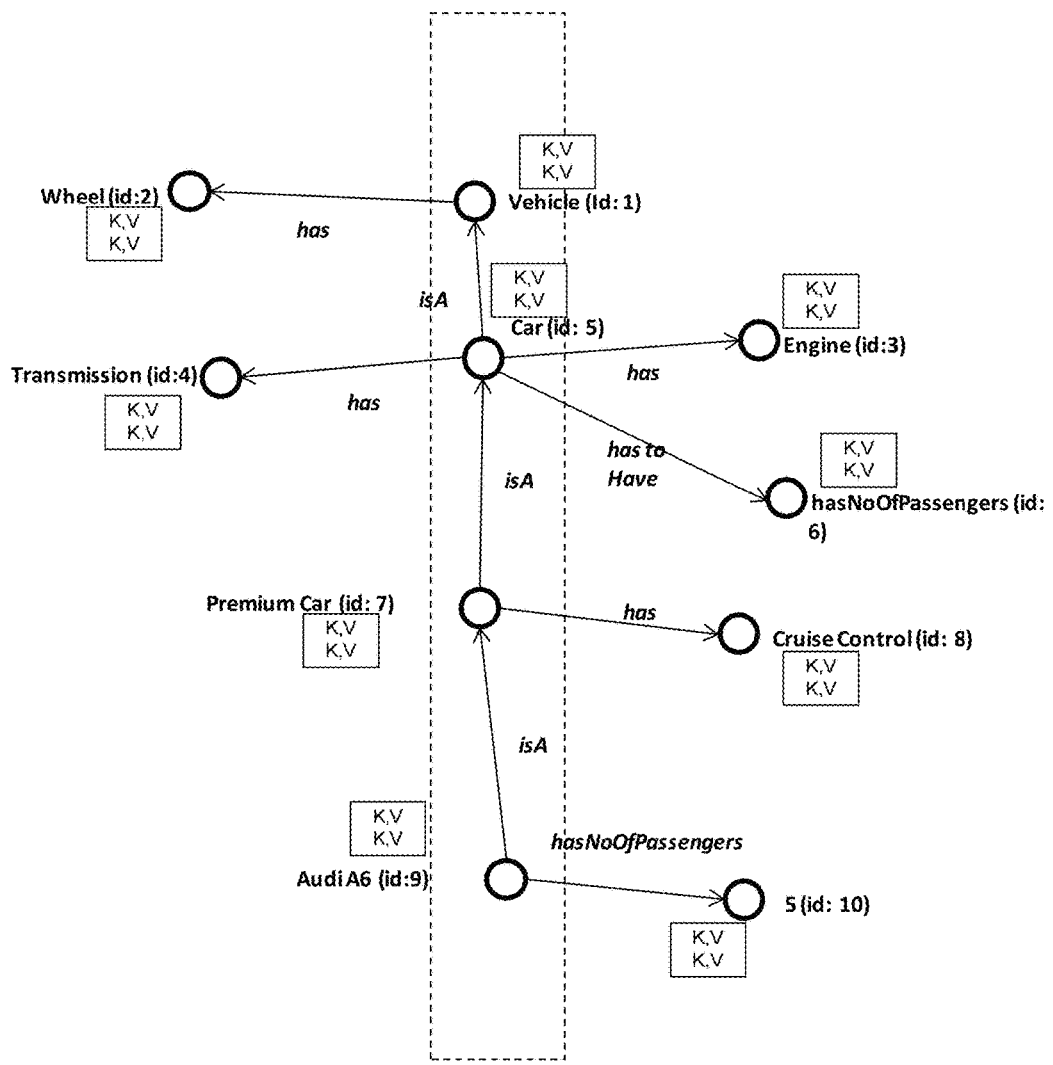
FIG. 7B illustrates how nodes corresponding to objects of FIG. 7a can be created onto the graph database layer, in accordance with an implementation of the present subject matter.

Referring now to FIG. 7B which describes that how nodes corresponding to objects of FIG. 7A can be created onto the graph database layer 126. The objects of the object database layer 124, as described in FIG. 7A, are represented as nodes in graph database layer 126. The object "vehicle" is represented as a parent node having nodes "car", "premium car", and "Audi A6™" as its child nodes. The node corresponding to the object "vehicle", the node corresponding to the object "car", the node corresponding to the object "premium car", and the node corresponding to the object "Audi A6™" may be understood as object nodes as they correspond to general objects of the object database layer 124. These object nodes have their corresponding constituent nodes. For example, the object node "vehicle" has "wheel" node as its corresponding constituent node. The "wheel" node corresponds to the object "wheel" that is constituent of the object "vehicle". Similarly, the object node "car" has "transmission" node and "engine" node as its constituent node. The object node "premium car" additionally has "cruise control" as its constituent node; and, the object node "Audi A6™" has number of passengers as its constituent node which is a literal node corresponding to a literal object.

Thus, the information from the object layer 124 is decomposed into and saved as (key, value) pair for nodes and edges in the graph layer 126, which is further decomposed and stored in the database layer 128, for example in BigData format. Since the information is decomposed and stored in the graph layer 126, the direct manipulation of the information in the graph layer 126 is much more complicated. Whereas, due to the presence of the object layer 124 in the multi-layered database 104, the information can be easily manipulated in the object layer 124 and the changes can automatically flow down and get incorporated into the underlying layers as discussed in the present subject matter.

Further, since the object layer 124 is pluggable over the graph layer 126, which in turn is pluggable over the database layer 128, and the information flows between layers through APIs, the configuration of each layer can be changed independently. For example, the type of database used in the database layer 128 may be changed or version may be updated without affecting the other two layers. In various examples, Hive, Hbase, HDFS, etc. may be used as the backend database in the database layer 128. Similarly, the techniques used to implement the graph layer 126 may be modified or updated without affecting the other two layers. For example, the graph layer may be Blueprint API configurable, and so it can be used interchangeably with any graph database which is Blueprint API configurable. In another example, the graph database in the graph layer 126 may use a Gremlin supported traversal language.

Further, since the manipulation of the object layer 124 is intuitive, in one example, the object layer 124 also provides the capability to mine additional intelligence from the information stored therein by inference generation using the objects as discussed below.

Figure 7C:
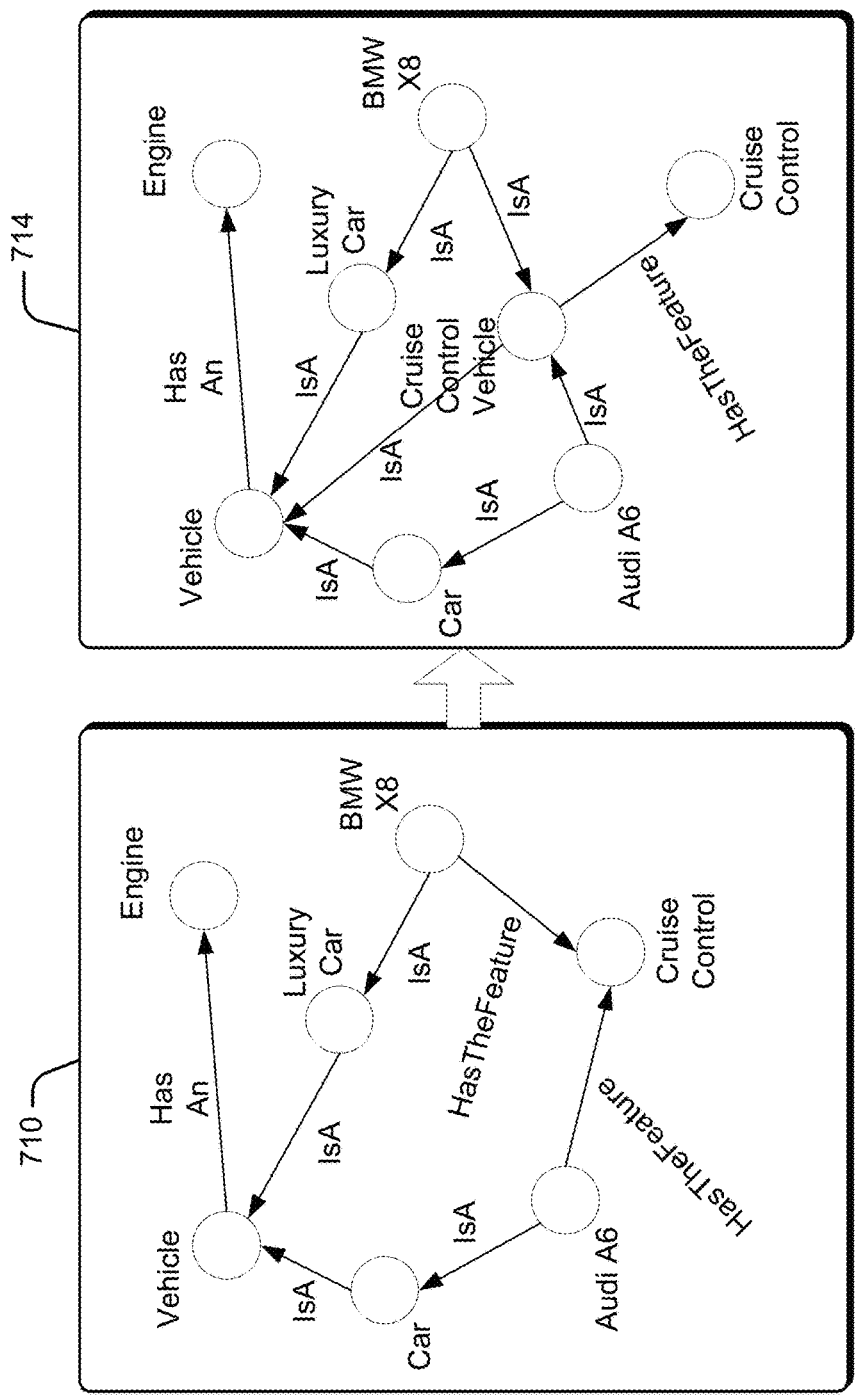
FIG. 7C illustrates an example of an inference generation feature of the graphical representation of the multi-layered database, in accordance with an implementation of the present subject matter.

FIG. 7C represents a graphical representation of an inference generation feature of the object database layer 124 of the multi-layered database. In one implementation, the inference generation may be based on predicate logic implementation. In an implementation, the multi-layered database can include a learning module (not shown in the figures). The learning module can use a predicate logic learning technique based on the constituent relationship of the objects and their properties, to generate a new inferred object. For example, as illustrated in FIG. 7c, an object 'Vehicle' is the parent object inheritable for an object 'Car' and an object 'Luxury Cars' as child objects. The object 'Car' is further a parent object for an object 'Audi A6™' and the object 'Luxury Car' is further a parent object for an object 'BMW X8™. Both the objects 'Audi A6™' and 'BMW X8™' are related to an object 'Cruise control' with 'hasTheFeature' constituent relationship. Therefore, an inference can be drawn that both the objects 'Audi A6™' and 'BMW X8™' can also be inheritable from an object 'Cruise Control Vehicle' as a parent object. Generally, a vehicle which has cruise control feature can be called as a 'cruise control vehicle'. To show this relationship in the example of FIG. 7C, the object 'Cruise Control Vehicle' is associated with an object 'Cruise Control' through a relationship 'hasTheFeature.' The object 'Cruise Control Vehicle' can further be related to the object 'vehicle' by 'isA' relationship. Based on the inference, the underlying graph database layer 126 can also be modified. As shown in FIG. 7C, an object graph 710 is an original graph and an object graph 714 is an inferred graph of the graph 710. The inferred graph can include inferred objects. For example, 'Cruise Control Vehicle' inferred object that has cruise control feature being depicted by 'hasTheFeature' constituent relationship. The inferred object 'Cruise Control Vehicle' can be mapped to an inferred object 'Audi A6™' and an inferred object 'BMW X8™' using the parent-child relationship represented as 'isA'. Therefore, the inferred object 'Audi A6™' and the inferred object 'BMW X8™' are directly mapped to the inferred object 'Cruise Control Vehicle. Thus, the feature of cruise control, represented as the inferred object 'Cruise Control', is now inherited by the inferred object 'Audi A6™' and the inferred object 'BMW X8™'.

Figure 8:
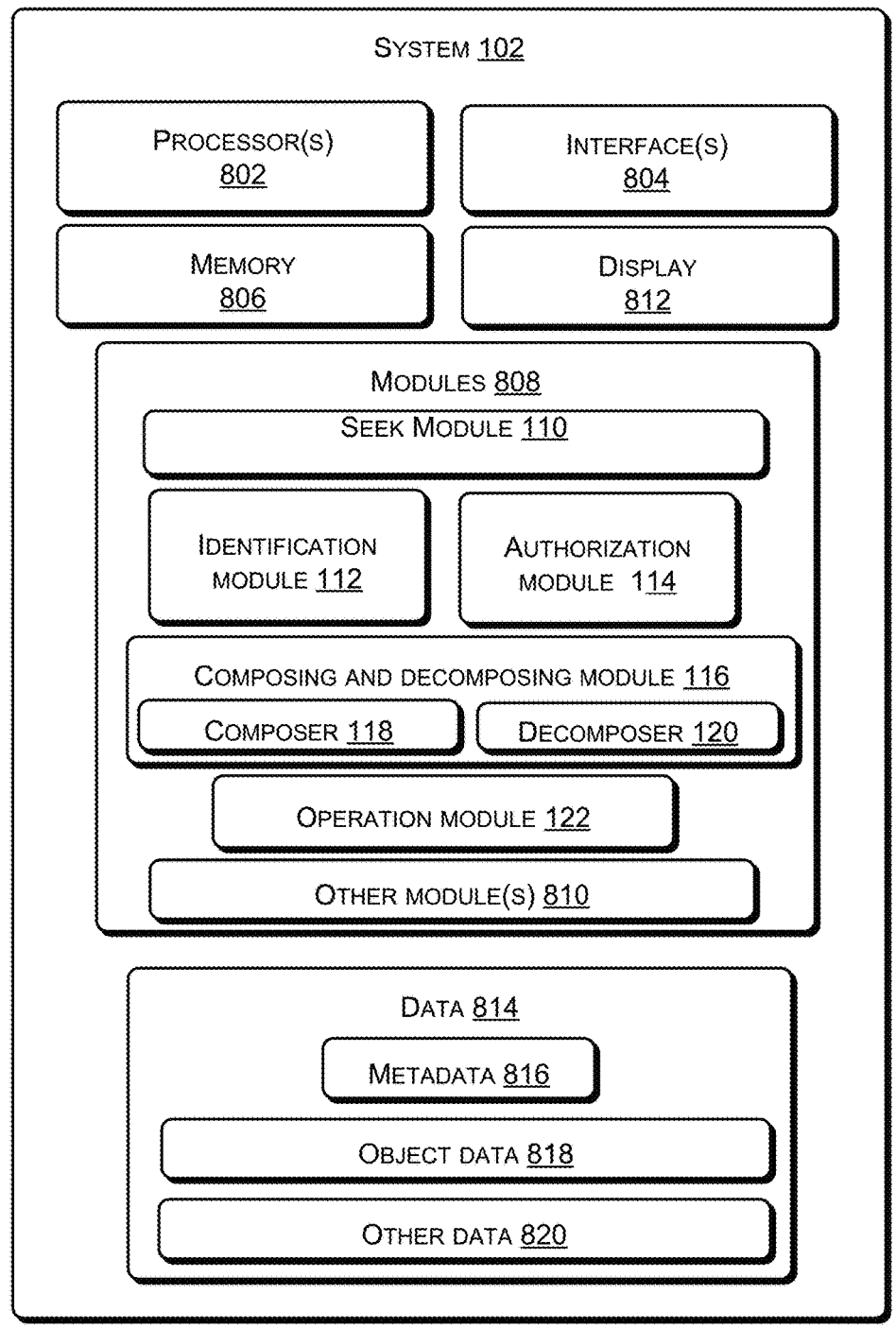
FIG. 8 illustrates a system for knowledge representation in a multi-layered database in detail, in accordance with an implementation of the present subject matter.

Referring now to FIG. 8, in an implementation, the system 102 includes processor(s) 802. The processor(s) 802 may be implemented as microprocessors, microcomputers, microcontrollers, digital signal processors, central processing units, state machines, logic circuitries, and/or any devices that manipulate signals based on operational instructions. Among other capabilities, the processor(s) 802 fetch and execute computer-readable instructions stored in a memory or non-transitory computer readable medium.

The functions of the various elements shown in FIG. 8, including any functional blocks labeled as "processor(s)", may be provided through the use of dedicated hardware as well as hardware capable of executing non-transitory machine readable instructions. Moreover, the term processor may implicitly include, without limitation, digital signal processor (DSP) hardware, network processor, application specific integrated circuit (ASIC), field programmable gate array (FPGA), read only memory (ROM) for storing non-transitory machine readable instructions, random access memory (RAM), and non-volatile storage. Other hardware, conventional and/or custom, may also be included.

The system 102 also includes interface(s) 804. The interface(s) 804 may include a variety of machine readable instruction-based and hardware-based interfaces that allow the system 102 to interact with other devices, including web servers, data sources, and external repositories, for the purpose of generation of digital signatures and digitally signed documents. Further, the interface(s) 804 may enable the system 102 to communicate with other communication devices, such as network entities, over a communication network.

Further, the system 102 includes memory 806, coupled to the processor(s) 802. The memory 806 may include any computer-readable medium, for example, volatile memory (e.g., RAM), and/or non-volatile memory (e.g., EPROM, flash memory, etc.). In one implementation, the system 102 can include a display 812 or can be coupled to a display 812. In other implementations, the display 812 can be coupled to or a part of one or more of the user devices 104. Accordingly, in such implementations, the system 102 can generate a GUI and provide to a user device 104 for displaying over the display 812.

Further, the memory 806 can include or be coupled to module(s) 808 and data 814. The module(s) 808 may be coupled to the processor(s) 802. The module(s) 808, amongst other things, includes routines, programs, objects, components, data structures, and the like, which perform particular tasks or implement particular abstract datatypes. In one implementation, the module(s) 808 can include the seek module 110, the identification module 112, authorization module 114, composing and decomposing module 116, operation module 122, and other modules 810. The composer 118 and the decomposer 120 in combination can form the composing and decomposing module 116. The other module(s) 810 further include modules that supplement applications on the system 102, for example, modules of an operating system.

The data 814 serves, amongst other things, as a repository for storing data that may be fetched, processed, received, or generated by the module(s) 808. In one implementation, the data 814 can include metadata 816, object data 224, and other data 820. The other data 820 can correspond to data generated or used by other modules 810. Although the data 814 is shown internal to the system 102, it may be understood that the data 814 can reside in an external repository (not shown in the figures), which may be coupled to the system 102. The system 102 may communicate with the external repository through the interface(s) 804 to obtain information from the data 814.

Further, as mentioned earlier, the system 102 can communicate with the multi-layered database 104, either directly or over a network, to receive data from, send data to, and edit data in the multi-layered database 104.

The following description describes knowledge representation through the system 102, in accordance with an example implementation of the present subject matter. Objects as used herein may be understood as digital information corresponding to the real world entities.

In operation, for retrieving information from the multi-layered database 104, a user can input a query, either using the user devices 106 or the system 102. For the purpose of querying information corresponding to the objects, the seek module 110 can generate a Graphical User Interface (GUI) for receiving a query from a user to retrieve information of objects from the multi-layered database 104 or to establish new relationship between the objects. The GUI can include interactive elements, such as APIs 302, to enable a user to create layers of the multi-layered database and retrieve information corresponding to the objects from the multi-layered database. The GUI enables the user to input information for creating, updating, and deleting the objects in the object database layer 124, and thereby also performing corresponding actions on the graph database layer 126 and the backend database layer 128.

Based on the query, the identification module 112 can identify the objects for which information is to be retrieved. After identification, privilege to access the information associated with the objects by the user can be checked. For checking the access privilege, the authorization module 114 can check for authorization credentials of the user. Based on the privilege to access the information, the authorization module 114 can restrict the access to the information associated with the objects. Role-based security feature can be implemented to check privilege to access the information associated with the objects.

When the user is privileged to access the information, the composer 118 can retrieve information corresponding to the objects from the graph database 126 and the backend database 128. After retrieving the information, the composer 118 can select the objects associated with the information. The selected objects can be displayed to the user, for example, on the display 812. For e.g., several objects associated with the information can be retrieved. An Arithmetic Logic operator can then 'select' the correct/desired objects and display it.

Further, the system 102 can operate in multiple modes, such as an embedded mode determined by the huge volume of data operations or in a standalone server mode for small volume data operations. For this, the user may need a privilege to execute scripts terminal or command prompt. In an implementation, the embedded mode can be implemented in business scenarios with the requisites of high availability or high throughput and low latency, such as big data environment. The system 102 can operate in the embedded mode by using an application. The application can work in any development environment such as, a JAVA environment, a Python environment and the like. In one example, the system 102 operates in embedded mode by implementing an application in a JAVA environment. Further, when the system 102 operates in the standalone server mode, it can support a language or framework that can send HTTP requests and receive HTTP responses. In one implementation, the standalone server mode of the system 102 can limit an access to a web management console with basic visualization and monitoring interface.

Figure 9:
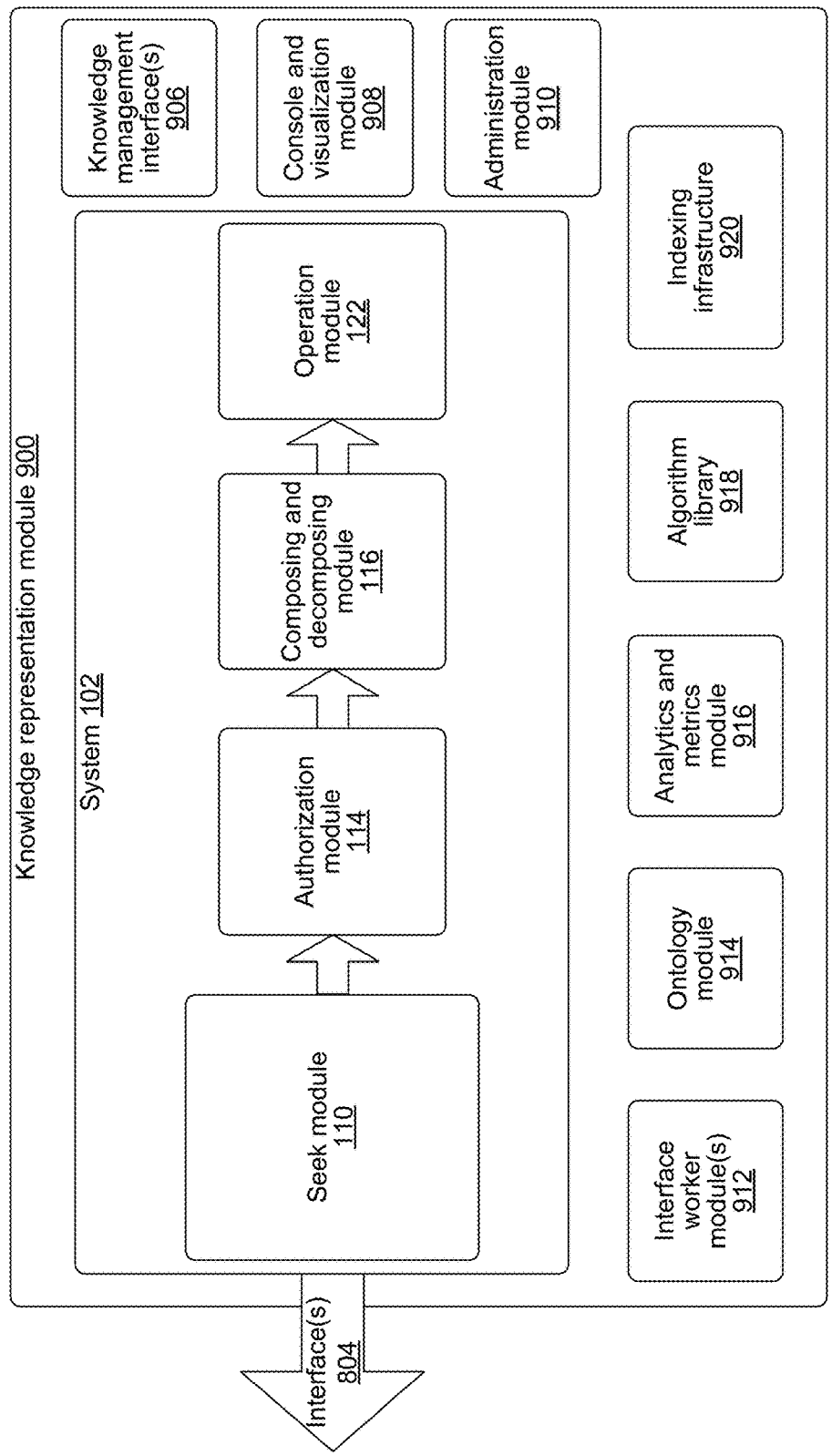
FIG. 9 illustrates various modules of the system for knowledge representation, in accordance with an implementation of the present subject matter.

Referring now to FIG. 9, which describes a knowledge representation module 900, which can be a part of a larger information technology (IT) infrastructure, such as an enterprise's IT infrastructure or the cloud infrastructure. The knowledge representation module includes the system 102, a knowledge management interface(s) 906, a console and visualization module 908, an administration module 910, an interface worker module (s) 912, an ontology module 914, an analytics and metrics module 916, an algorithm library 918, and an indexing infrastructure 920. The knowledge representation module 900 can be implemented for knowledge management of an organization. Knowledge management (KM) may be understood as the process of capturing, developing, sharing, and effectively using knowledge of an organization. For knowledge management, it is required to input, update, delete, and merge knowledge corresponding to several teams, including several employees, projects, and business units of the organization.

The interface worker module(s) 912 can acquire knowledge as raw data from several input sources. These input sources, for example, can be web, mobile application, and the like. The knowledge acquired by the interface worker module(s) 912 can then be stored in a raw data storage (not shown in the figures). Using these stored raw data, facts or logics can be generated to represent the data through the knowledge representation module 900. The knowledge management interface 906 facilitates in managing knowledge corresponding to several teams of the organization. Knowledge related to several domains may be understood as ontology. The ontology may be understood as a formal framework for representing the knowledge. This framework can name and define several types, properties, and interrelationships of the entities in a domain. The ontology module 914 can facilitate in naming and defining the types, properties, and interrelationships of the entities. For this, the ontology module 914 reproduces a logical architecture of the organization and entities in the organization arranged in several relationships such as, parent-child relationship, constituent relationship or any other kind of relationship. This logical architecture can be based on a plurality of rules or algorithms. These rules or algorithms can be stored in the algorithm library 918. The algorithm library 918 provides access to an administrator, through the administration module 910, for defining several types, properties, and interrelationships of the entities, using these rules and algorithm. While defining several types, properties, and interrelationships of the entities, the administrator can visualize the changes in the console and visualization module 908. Further, after this, the analytics and metrics module 916 can facilitate in harvesting the knowledge represented in the knowledge representation module 900 for knowledge retrieval. Knowledge harvesting may be understood as capturing and expressing knowledge in a form that can be easily accessed and used by several users who seek the information. The indexing infrastructure 920 can be a pluggable indexing infrastructure mechanism as discussed herein and can include an indexing module for creating the indices as discussed with respect to various implementations of the present subject matter.

Figure 10:
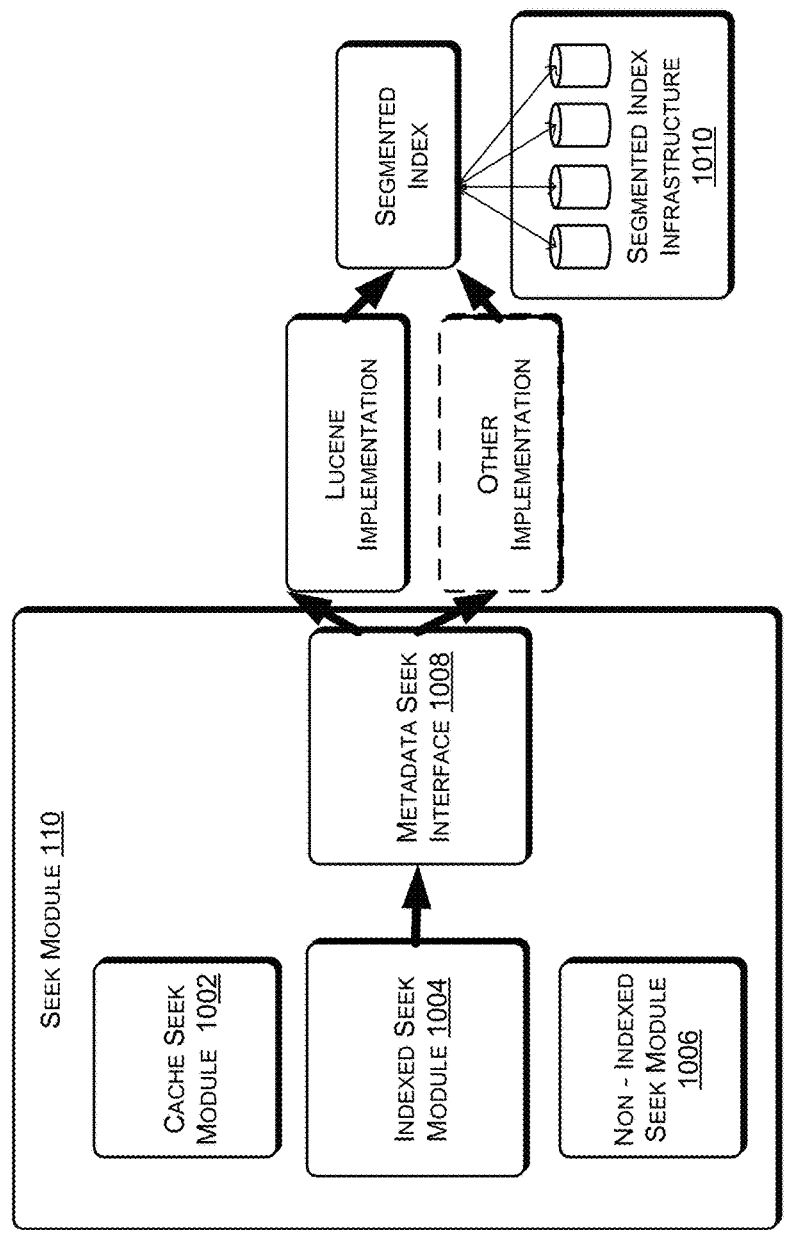
FIG. 10 illustrates the implementation of the seek module, in accordance with an implementation of the present subject matter.

Referring now to FIG. 10, which describes the seek module 110. The seek module 110 includes a cache seek module 1002, an indexed seek module 1004, a non-indexed seek module 1006, a metadata seek interface 1008. The seek module 110 can receive a query from a user to seek objects or information of objects to be retrieved. The seek module 110 can include the cache seek module 1002 that facilitates retrieval of information which is frequently accessed. Further, for retrieving the information from the backend database layer 128, the indexed seek module 1004 and the non-indexed seek module 1006 can be implemented. The indexed seek module 1004 enables to retrieve the information using an indexing infrastructure. In one example, the indexing infrastructure can be created by constructing a query parser along with tables for storing indices. In another example, the indexing mechanism can be based on a Lucene index implementation on an index layer which includes index storage. The index storage can store the indices in a distributed storage infrastructure or a segmented index infrastructure 1010.

Figure 11:
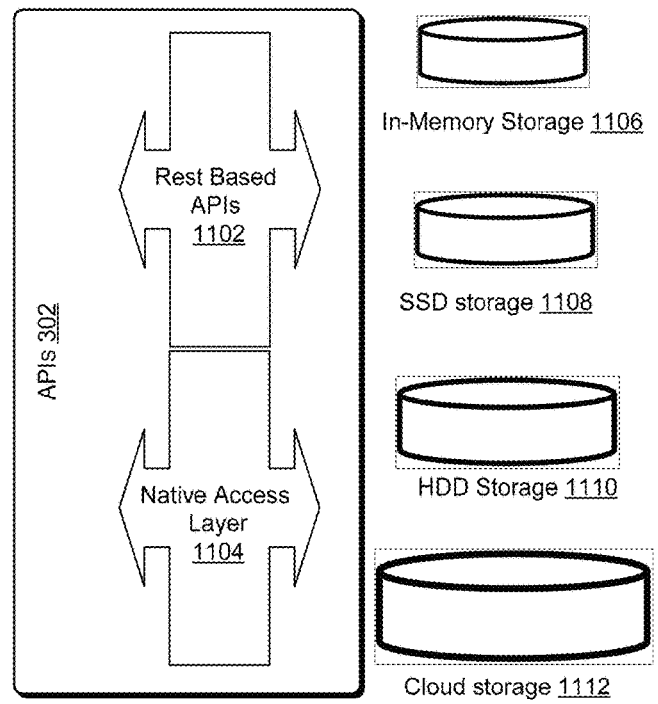
FIG. 11 illustrates a data management system for accessing data, in accordance with an implementation of the present subject matter.
Figure 12:
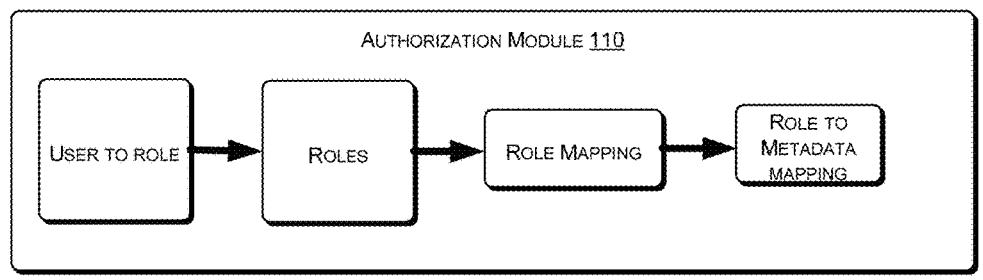
FIG. 12 illustrates an authorization module for determining access privilege for a user, in accordance with an implementation of the present subject matter.

FIG. 11 illustrates data management system for accessing data, including cache mechanism built on a cache layer. The data storage and access mechanism can be visualized as a multi-temperature data storage, where data storage having frequently accessed objects are visualized as hot data storage and that having rarely accessed objects are visualized as cold storage. The multi-temperature data management system can be implemented as a system storing hot data that is frequently accessed on fast storage, compared to less-frequently accessed warm data stored on slightly slower storage, rarely accessed cold data stored on a slower storage, and a very rarely accessed colder data stored on a slowest storage.

In one example, the frequently accessed object information can be accessed through APIs 302s. In one implementation, the APIs 302 can include rest based APIs 1102 and an access layer 1104 native to the data management system. The data management system can include in-memory storage 1106, solid state drive (SSD) storage 1108, a hard disk drive (HDD) storage 1110, and a cloud based storage 1112. The in-memory storage 11106 can store colder data, the HDD storage 1110 can store cold data, the SSD storage 1108 can store warm data, and the in-memory storage 1106 can store hot data. Further, for retrieving the frequently accessed object information, the cache seek module 1002 can check for information in subsequent data storages in a successive manner, thereby reducing the information retrieval time. For example, if data is not available in SSD storage 1108 the cache seek module 1002 can check for the data in subsequent storage, i.e., HDD storage 1110 and then in cloud storage 1112.

Figure 13:
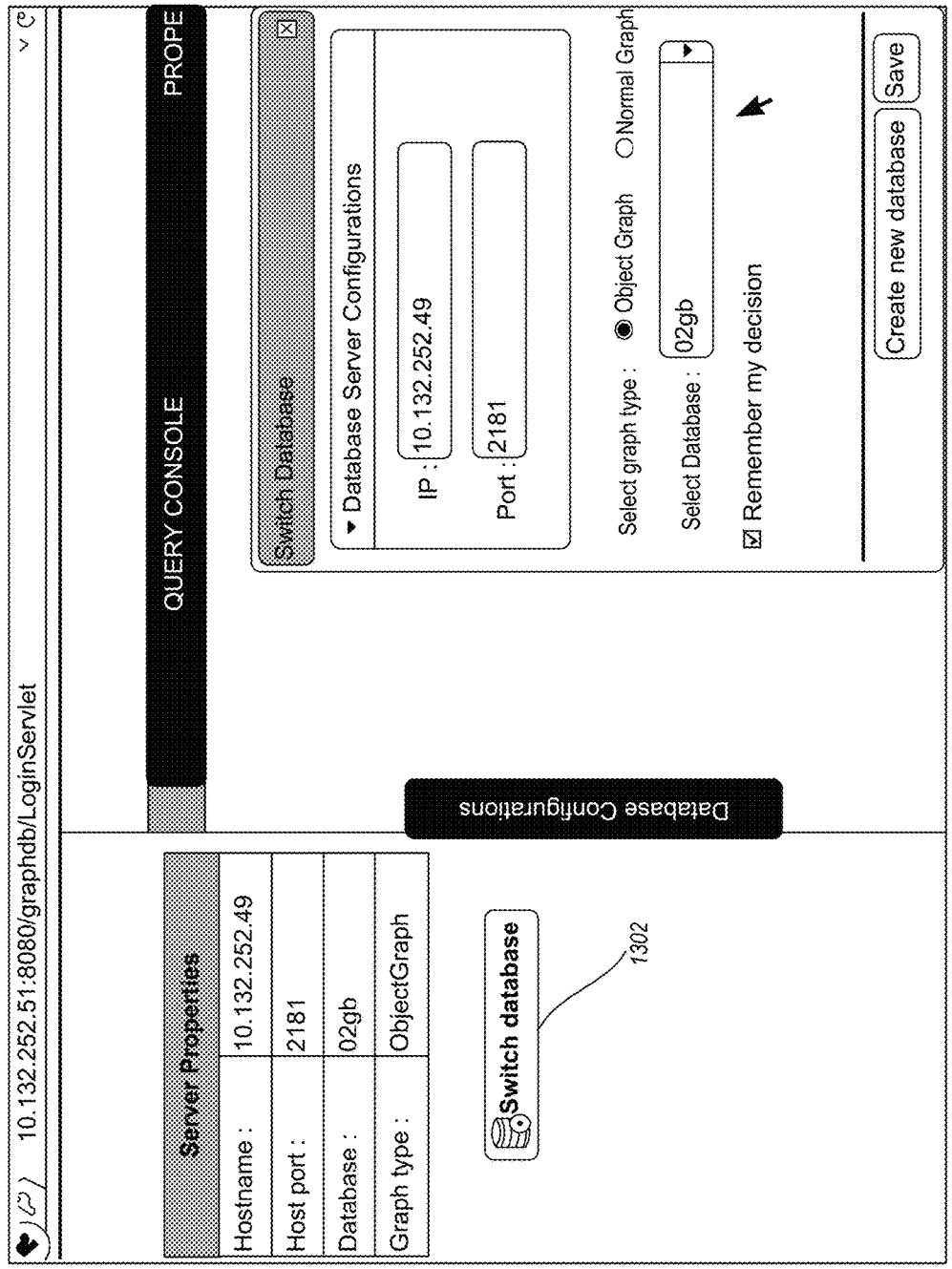
FIG. 13 illustrates a GUI to facilitate for switching from one database layer to other database layer, in accordance with an implementation of the present subject matter.

FIG. 13 illustrates a GUI displayed by the seek module 110. The GUI facilitates a user to switch from view corresponding to one database layer to that of another database layer. In an example, the GUI provides a tab 1302 or an option for switching from view of one database layer to another database layer. In one implementation, when the user clicks on the tab 1302, a pop-up window opens which include an option to select one of the object database layer 124 or the graph database layer 126. The user selects the desired database layer such as, object database layer 124 and the graph database layer 126, to switch from one database layer to other database layer. In another implementation, the system 102 can receive input from the user through the GUI to switch from one database layer to other database layer.

Figure 14:
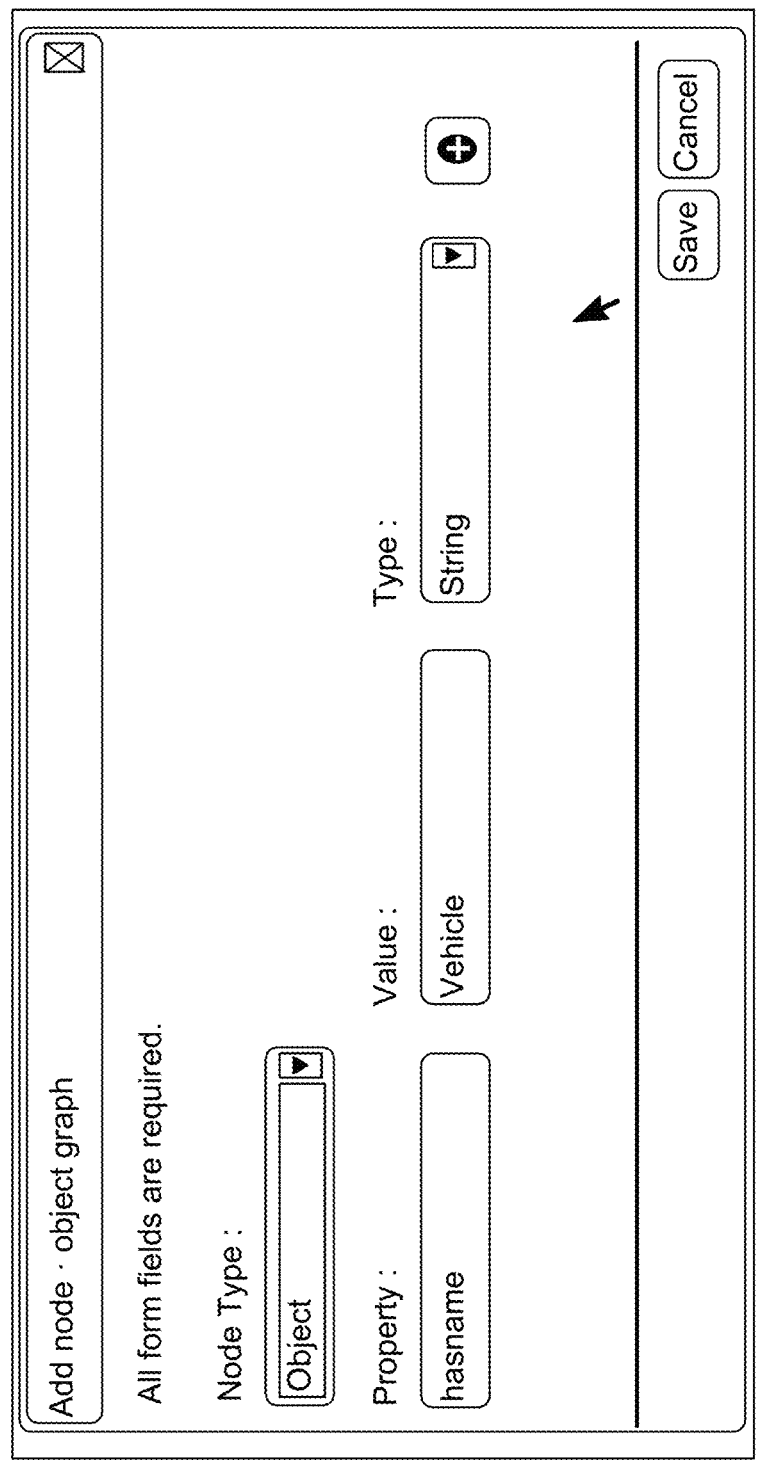
FIG. 14 illustrates a GUI for adding or creating an object on the object database layer, in accordance with an implementation of the present subject matter.

Referring now to FIG. 14 which illustrates a GUI displayed by the operation module 122. The GUI enables a user to add or create an object in the object database layer 124. This GUI includes a field for choosing an object type. The object type can include a general objector a literal object of the object database layer 124. It will be understood that system objects relate to system functions and so are generally not user defined. System objects may be created by the system 102, such as the operation module 122, or by a system administrator using the operation module 122. The general object and literal object, on the other hand, may be user defined and created/manipulated by a user.

The GUI further includes a field to enter the property of the object, value of the object, and type of the object. The value of the object can include a name of the object. The type of the object can include whether the object is defined as a string object, a numeric object, or an alpha-numeric object. In one implementation, the system 102 can receive the inputs from the user for adding or creating an object in the object database layer 124.

Figure 15:
FIG. 15 illustrates a GUI for adding or creating relationships between the objects of the object database layer, in accordance with an implementation of the present subject matter.
Figure 16:
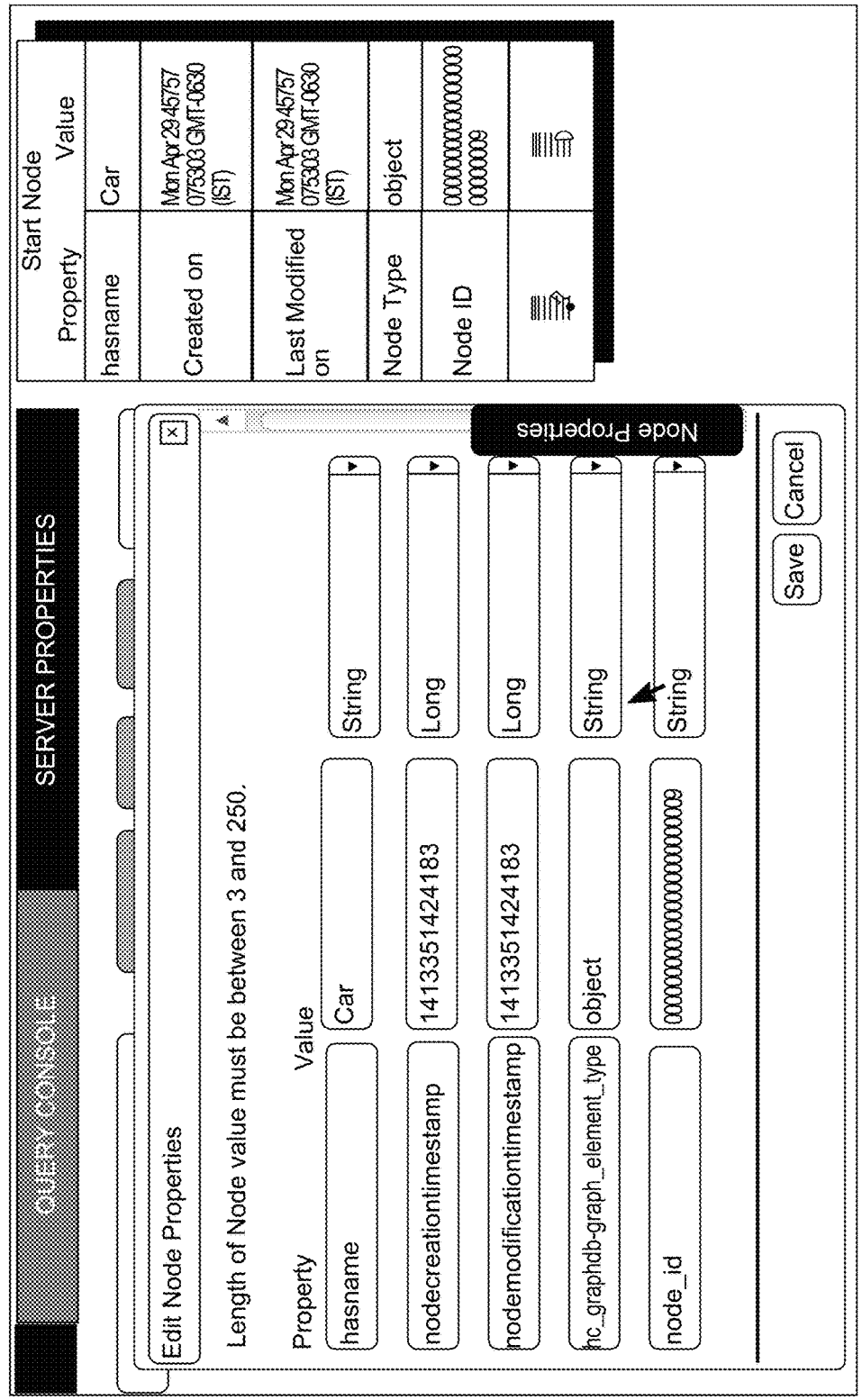
FIG. 16 illustrates a GUI for editing several parameters of the object, in accordance with an implementation of the present subject matter.

FIG. 15 illustrates a GUI displayed by the operation module 122. The GUI enables a user to add or create relationships between the objects of the object database layer 124. For this purpose, this GUI includes a field to enter name of the object, and a field to select relationship types. When user selects the relationship type and enters the name of the object, the system 102 receives input through the GUI and adds or creates relationships among the objects in the object database layer 124. Referring now to FIG. 16 which illustrates a GUI displayed by the operation module 122. The GUI enables a user to edit several parameters of the object. These parameters can include properties of the objects, value of the objects, and type of the objects. The GUI can include several fields to enter these parameters.

When the user enters these parameters in a pop-up window, the system 102 receives input through the GUI and edits the parameters of the object.

Figure 17:
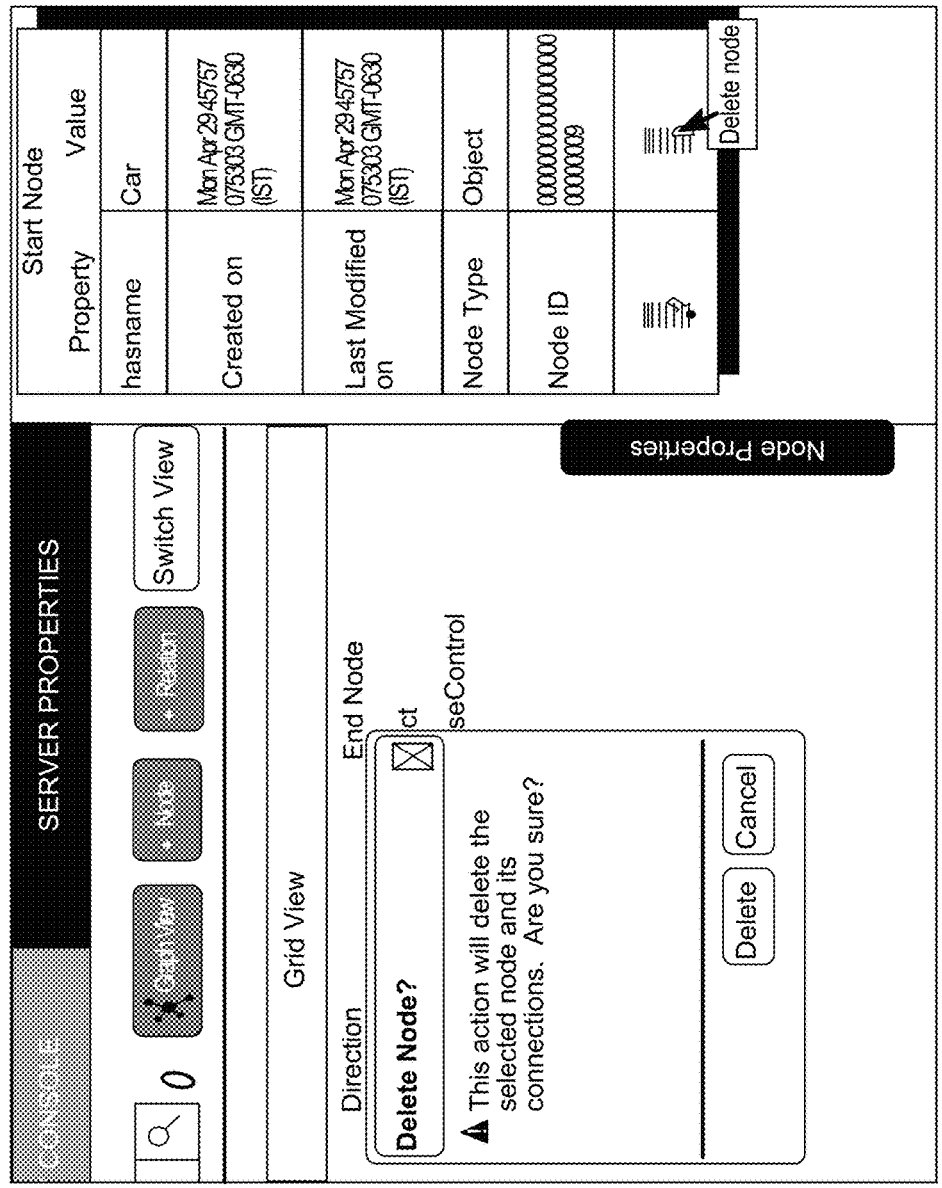
FIG. 17 illustrates a GUI for facilitating deletion of an object of the object database layer, in accordance with an implementation of the present subject matter.

Referring now to FIG. 17 which illustrates a GUI displayed by the operation module 122. The GUI enables the user to delete an object of the object database layer 124. The system 102 receives the input from the user through the GUI and deletes object which the user wish to delete. The system 102 can further generate an alert when an object is modified. The modification of the object can include deleting an object, adding an object, updating properties of an object and the like.

Figure 18:
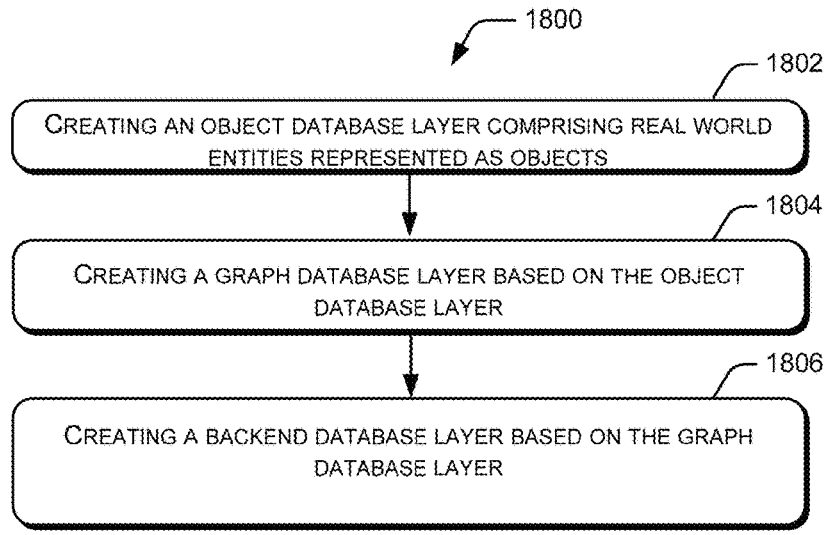
FIG. 18 illustrates an example method for knowledge representation in a multi-layered database, in accordance with an implementation of the present subject matter.

FIG. 18 illustrates an example method 1800 knowledge representation in a multi-layered database, in accordance with an implementation of the present subject matter. In an example, the method 1800 may be implemented by a module of a computing system, such as the modules 808 of the system 102.

The order in which the method is described is not intended to be construed as a limitation, and any number of the described method blocks can be combined in any order to implement the method, or any alternative methods. Additionally, individual blocks may be deleted from the method without departing from the subject matter described herein. Furthermore, the methods can be implemented in any suitable hardware platform(s).

The method may be described in the general context of computer executable instructions. Generally, computer executable instructions can include routines, programs, objects, components, data structures, procedures, modules, functions, etc., that perform particular functions or implement particular abstract datatypes. The method may also be practiced in a distributed computing environment where functions are performed by remote processing devices that are linked through a communications network. In a distributed computing environment, computer executable instructions may be located in both local and remote computer storage media, including memory storage devices.

In another implementation, the method may be stored and executed as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also be included in the scope of computer-readable media.

Referring to FIG. 18, at block 1802, an object database layer may be created. The object database layer can include real world entities represented as objects. Each of the objects is associated with respective properties. The properties include attributes of the real world entities and relationships among the objects. The creation of object database layer can be done, for example, by the operation module 122, as discussed above.

At block 1804, a graph database layer may be created. The creation of the graph database layer is based on the object database layer. The graph database layer includes nodes and edges relating these nodes. The creation of the graph database layer is done by decomposing the objects of the object database layer into nodes, properties associated with the nodes, edges connecting the nodes, and properties of the edges. The properties associated with the nodes indicate the properties of the objects. The edges indicate the relationships among the objects of the object database layer. The creation of the graph database layer can be done, for example, by the operation module 122, as discussed above.

At block 1806, a backend database layer is created. The creation of the database layer is based on the graph database layer. The backend database layer includes data and metadata corresponding to the nodes, the properties associated with the nodes, the edges, and properties of the edges of the graph database layer. In one example, the backend database layer can provide for scalable data storage through one or more of HDFS, HBASE, RDBMS, or other types of databases and file systems. The creation of the backend database layer can be done, for example, by the operation module 122, as discussed above.

Figure 19:
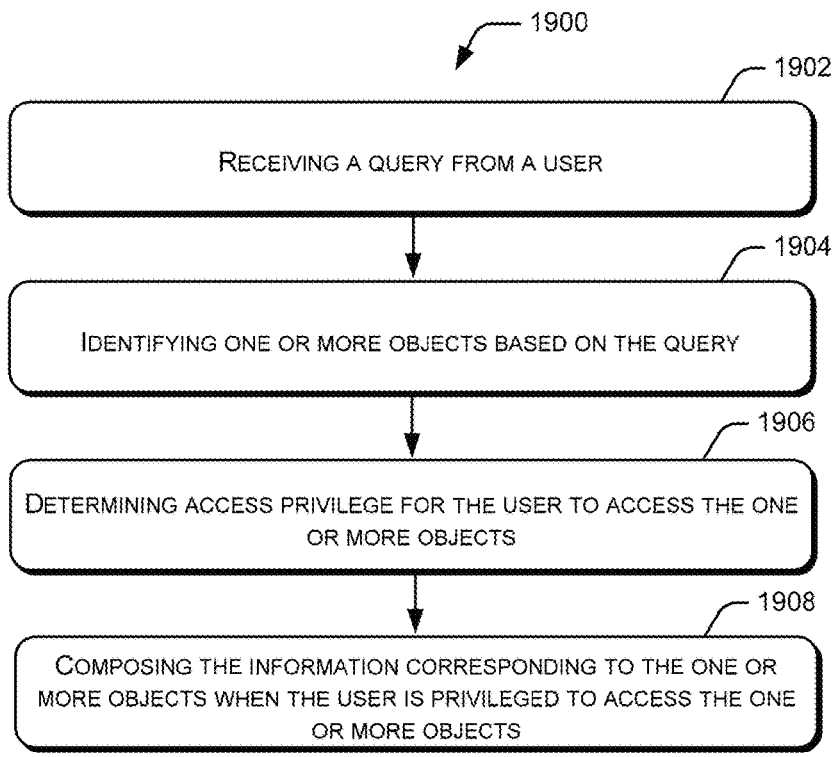
FIG. 19 illustrates an example method for retrieval of information from the multi-layered database, in accordance with an implementation of the present subject matter.

FIG. 19 illustrates an example method 1900 for retrieval of information from the multi-layered database, in accordance with an implementation of the present subject matter. In an example, the method 1900 may be implemented by a module of a computing system, such as the modules 808 of the system 102.

Referring now to FIG. 19, at block 1902, a query is received from a user. The query can include data corresponding to entities for which information has to be retrieved. In one example, the query can include a Structured Query Language (SQL) based query. The query can be received, for example, by the seek module 110, as discussed above.

At block 1904, based on the query one or more objects are identified for which information has to be retrieved. The one or more objects can be identified, for example, by the identification module 112, as discussed above.

At block 1906, access privilege for the user is determined. The access privilege indicates whether user is authorized to access the one or more objects or not. The access privilege for the user can be determined, for example, by the authorization module 114.

At block 1908, information corresponding to the one or more objects is composed. The information is composed only when the user is privileged to access the one or more objects. The information corresponding to the one or more objects can be composed, for example, by the composer 118, as discussed above.

Figure 20:
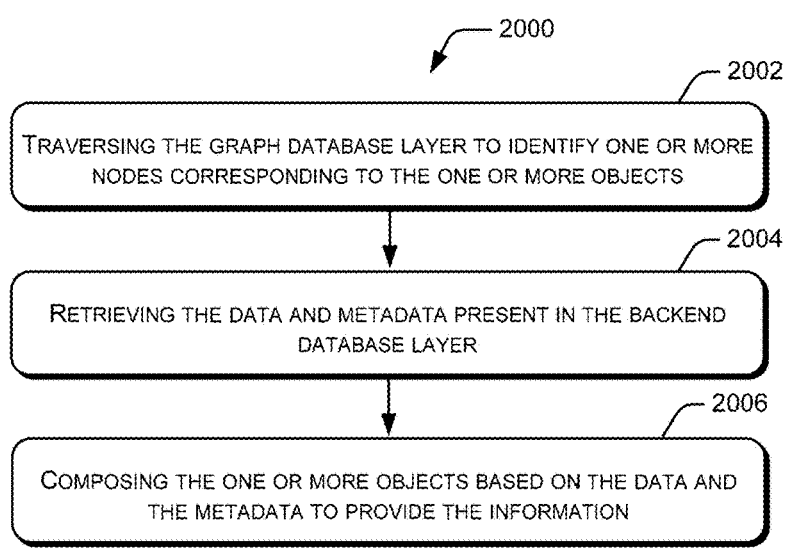
FIG. 20 illustrates an example method for composing the information corresponding to the one or more objects, in accordance with an implementation of the present subject matter.

FIG. 20 illustrates an example method 2000 for composing the information corresponding to the one or more objects, in accordance with an implementation of the present subject matter. In an example, the method 2000 may be implemented by a module of a computing system, such as the modules 808 of the system 102.

At block 2002, the graph database layer is traversed to identify one or more nodes corresponding to the one or more identified objects. The graph database layer may also be traversed to identify the edges indicating relationships among the one or more nodes and the properties associated with the one or more nodes. The graph database layer can be traversed, for example, by the operation module 122, as discussed above.

At block 2004, data and metadata present in a backend database layer is retrieved. The data and metadata can be retrieved, for example, by the operation module 122.

At block 2006, the one or more objects can be created. The creation of the one or more objects is based on the data and the metadata determined at block 2004. The one or more objects can be created, for example, by the operation module 122, as discussed above.

Although implementations for methods and systems for knowledge representation in a multi-layered database are described, it is to be understood that the present subject matter is not necessarily limited to the specific features or methods described. Rather, the specific features and methods are disclosed as implementations for knowledge representation in a multi-layered database.

What is claimed is:

1. A system for storing data using a knowledge representation scheme in a multi-layered database, the system comprising:
 a processor;
 an operation module coupled to the processor to:
  receive attributes of a real world entity for storage in the multi-layered database, wherein the attributes characterize properties and relationships of the real world entity; and
  store an object corresponding to the real world entity in an object database layer of the multi-layered database, wherein, based on the attributes of the real world entity, the object is associated with object properties that characterize the object, at least one object relationship that relates the object to at least one other object, and relationship properties that characterize the object relation, wherein the object and the at least one object relationship are manipulated independently; and
 a decomposer coupled to the processor to:
  decompose the object, the object properties, the object relationship, and the relationship properties into a node, node properties associated with the node, at least one edge, and edge properties associated with the edge, wherein the node properties are indicative of the object properties, the edge is indicative of the object relationship, and the edge properties are indicative of the relationship properties of the object;
  store the node, the node properties, the edge, and the edge properties in a graph database layer of the multi-layered database, wherein the edge connects the node with at least one other node corresponding to the at least one other object;
  decompose further the node, the node properties, the edge, and the edge properties into the data and metadata associated with the data; and
  store the data and the metadata corresponding to the node of the graph database layer in a backend database layer of the multi-layered database, wherein the backend database layer is scalable in real-time, wherein the backend database layer further store the node properties as the data and store the edge properties as the metadata,
 wherein the object database layer is pluggable over the graph database layer and the graph database layer is pluggable over the backend database layer to independently change configuration of each layer,
 wherein with presence of the object database layer in the multi-layered database, changes in information of the object database layer is automatically incorporated into the nodes and edges in the graph database layer, and the object in the backend database layer,
 wherein the object database layer facilitates adding a new real world entity to the graph database layer unaltering the node and the edge.

2. The system of claim 1, wherein the object relationship includes at least one of a parent-child relationship, a constituent relationship, and a general relationship, wherein in the parent-child relationship a child object inherits the object properties and constituent relationships of a parent object, wherein in a constituent relationship a constituent object is a part of a constituted object, and wherein in a general relationship the object relationship is a general association with another object.

3. The system of claim 2, wherein the operation module is configured to update the object properties and the constituent relationships of the parent object inherited by the child object, wherein the updating includes one of adding, modifying, and overriding an object property of the parent object by the child object.

4. The system of claim 2, wherein a child node in the graph database layer corresponding to the child object in the object database layer inherits the node properties and constituent relationships of a parent node in the graph database layer corresponding to the parent object in the object database layer.

5. The system of claim 1, wherein the object is one of a general object, a system object, and a literal object, and the node is correspondingly one of an object node, a system node, and a literal node.

6. The system claim 1, wherein the operation module is configured to provide a graphical user interface (GUI) to a user for entering the attributes, wherein rendering of the GUI is selectable by the user from object based rendering, graphical rendering, and tabular rendering.

7. The system of claim 1, wherein the operation module is configured to:
 generate an inferred object related to existing objects in the object database layer and inferred relationship of the inferred object, based on predicate logic, wherein the predicate logic depends on constituent relations of the existing objects; and
 store the inferred object and the inferred relationship in the object database layer, corresponding inferred node and inferred edges in the graph database layer, and corresponding inferred data and inferred metadata in the backend database layer.

8. The system of claim 1, wherein the system is coupled to an indexing module to index the node, node properties, edges, and the edge properties based on at least one indexing technique, wherein the at least one indexing technique is pluggable to the graph database layer.

9. The system of claim 1, wherein the object properties include at least one of temporal information and geo-spatial information, and wherein the data and the metadata include corresponding temporal data and metadata, and corresponding geo-spatial data and metadata.

10. The system of claim 1, wherein the operation module receives the attributes of the real world entity as part of a plurality of real world entities received as bulk information, and wherein the operation module generates the object, the relationship, the node, the edges, the data and the metadata for each of the plurality of real world entities for storage of the bulk information in the multi-layered database.

11. The system of claim 1, wherein the backend database layer performs a map reduce technique on the data and the metadata for storage.

12. A system for retrieving information using a knowledge representation scheme in a multi-layered database, the system comprising:
   a processor;
   a seek module coupled to the processor to:
      receive a query from a user to retrieve the information from the multi-layered database;
      identify, based on the query, one or more objects in an object database layer of the multi-layered database, wherein the information to be retrieved corresponds to the one or more objects, and wherein each of the one or more the objects is associated with object properties that characterize an object, an object relationship that relates the object to at least one other object, and relationship properties of the object relationship, wherein the object and the object relationship are manipulated independently;
   an authorization module coupled to the processor to determine access privileges for the user to access the one or more objects, wherein the access privileges are based on user role; and
   a composer module coupled to the processor to
      compose the information corresponding to the one or more objects from a graph database layer and a backend database layer when the user is privileged to access the one or more objects, wherein, for each of the one or more objects, the graph database layer includes a node, node properties, edges connecting the node to at least one other node, and edge properties for each of the edges, and wherein, for each node and edge, the backend database layer stores the node properties as the data and store the edge properties as metadata, wherein the backend database layer is scalable in real-time; and
      provide the composed information to the user in response to the query,
   wherein the object database layer is pluggable over the graph database layer and the graph database layer is pluggable over the backend database layer to independently change configuration of each layer,
   wherein with presence of the object database layer in the multi-layered database, changes in information of the object database layer is automatically incorporated into the nodes and edges in the graph database layer, and the object in the backend database layer,
   wherein the object database layer facilitates adding a new real world entity to the graph database layer unaltering the node and the edge.

13. The system of claim 12, wherein the composing includes:
   traversing the graph database layer to identify one or more nodes corresponding to the one or more objects, the edges connecting the one or more nodes, and the properties associated with the one or more nodes and the edges;
   obtaining the data and the metadata corresponding to the one or more nodes and the edges from the backend database layer; and
   compiling the one or more nodes based on the data and the metadata, and the one or more objects based on the one or more nodes to form the composed information.

14. The system of claim 13, wherein the obtaining the data and the metadata corresponding to the one or more nodes comprises searching for the data and the metadata in a plurality of storage media based on a frequency of access of the data and the metadata, wherein the plurality of storage media is selected from a cache memory, an internal storage device, an external storage device, and cloud storage media.

15. The system of claim 12, wherein the identifying the one or more objects includes performing, by the seek module, a search based on the query in the object database layer and an index of the graph database layer.

16. The system of claim 15, wherein the index is a segmented index implementing a plurality of indexing techniques.

17. The system of claim 12, wherein the identifying the one or more objects includes performing, by the seek module, a non-indexed search on the objects in the object database layer.

18. A computer implemented method for storing data using a knowledge representation scheme in a multi-layered database, the method comprising:
   receiving, by a processor, attributes of a real world entity for storage in the multi-layered database, wherein the attributes characterize properties and relationships of the real world entity;
   storing, by the processor, an object corresponding to the real world entity in an object database layer of the multi-layered database, wherein, based on the attributes of the real world entity, the object is associated with object properties that characterize the object, at least one object relationship that relates the object to at least one other object, and relationship properties that characterize the object relation, wherein the object and the at least one object relationship are manipulated independently;
   decomposing, by the processor, the object, the object properties, the object relationship, and the relationship properties into a node, node properties associated with the node, at least one edge, and edge properties associated with the edge, wherein the node properties are indicative of the object properties, the edge is indicative of the object relationship, and the edge properties are indicative of the relationship properties of the object;
   storing, by the processor, the node, the node properties, the edge, and the edge properties in a graph database layer of the multi-layered database, wherein the edge connects the node with at least one other node corresponding to the at least one other object;
   decomposing further, by the processor, the node, the node properties, the edge, and the edge properties into the data and metadata associated with the data; and
   storing, by the processor, the data and the metadata corresponding to the node of the graph database layer in a backend database layer of the multi-layered database, wherein the backend database layer is scalable in real-time, wherein the backend database layer further store the node properties as the data and store the edge properties as the metadata,
   wherein the object database layer is pluggable over the graph database layer and the graph database layer is pluggable over the backend database layer to independently change configuration of each layer,
   wherein with presence of the object database layer in the multi-layered database, changes in information of the object database layer is automatically incorporated into the nodes and edges in the graph database layer, and the object in the backend database layer, wherein the object database layer facilitates adding a new real world entity to the graph database layer unaltering the node and the edge.

19. The method of claim 18, wherein the object relationship includes at least one of a parent-child relationship, a constituent relationship, and a general relationship, wherein in the parent-child relationship a child object inherits the object properties and constituent relationships of a parent object, wherein in a constituent relationship a constituent object is a part of a constituted object, and wherein in a general relationship the object relationship is a general association with another object.

20. The method of claim 19 comprising updating, by the processor, the object properties and the constituent relationships of the parent object inherited by the child object, wherein the updating includes one of adding, modifying, and overriding an object property of the parent object by the child object.

21. The method of claim 19, wherein a child node in the graph database layer corresponding to the child object in the object database layer inherits the node properties and constituent relationships of a parent node in the graph database layer corresponding to the parent object in the object database layer.

22. The method of claim 18, wherein the object is one of a general object, a system object, and a literal object, and the node is correspondingly one of an object node, a system node, and a literal node.

23. The method of claim 18, wherein the receiving the attributes of the real world entity comprises providing a graphical user interface (GUI) to a user for entering the attributes, wherein rendering of the GUI is selectable by the user from object based rendering, graphical rendering, and tabular rendering.

24. The method of claim 18 comprising:
generating, by the processor, an inferred object related to existing objects in the object database layer and inferred relationship of the inferred object, based on predicate logic, wherein the predicate logic depends on constituent relations of the existing objects;
storing, by the processor, the inferred object and the inferred relationship in the object database layer, corresponding inferred node and inferred edges in the graph database layer, and corresponding inferred data and inferred metadata in the backend database layer.

25. The method of claim 18 comprising indexing the object, object properties, and the object inter-relationship based on at least one indexing technique, wherein the at least one indexing technique is pluggable to the graph database layer.

26. The method of claim 18, wherein the object properties include at least one of temporal information and geo-spatial information, and wherein the data and the metadata include corresponding temporal data and metadata, and corresponding geo-spatial data and metadata.

27. The method of claim 18, wherein the receiving the attributes of the real world entity comprises receiving the attributes of a plurality of real world entities as bulk information, and wherein the method further comprises generating the object, the relationship, the node, the edges, the data and the metadata for each of the plurality of real world entities for storage of the bulk information in the multi-layered database.

28. The method of claim 18, wherein the backend database layer performs a map reduce technique on the data and the metadata for storage in a distributed database.

29. A computer implemented method for retrieving information using a knowledge representation scheme in a multi-layered database, the method comprising:
receiving, by a processor, a query from a user to retrieve the information from the multi-layered database;
identifying, by the processor, based on the query, one or more objects in an object database layer of the multi-layered database, wherein the information to be retrieved corresponds to the one or more objects, and wherein each of the one or more the objects is associated with object properties that characterize an object, an object relationship that relates the object to at least one other object, and relationship properties of the object relationship, wherein the object and the object relationship are manipulated independently;
determining, by the processor, access privileges for the user to access the one or more objects, wherein the access privileges are based on user role;
composing, by the processor, the information corresponding to the one or more objects from a graph database layer and a backend database layer when the user is privileged to access the one or more objects, wherein, for each of the one or more objects, the graph database layer includes a node, node properties, edges connecting the node to at least one other node, and edge properties for each of the edges, and wherein, for each node, the backend database layer stores the node properties as data and store the edge properties as metadata, wherein the backend database layer is scalable in real-time; and
providing, by the processor, the composed information to the user in response to the query,
wherein the object database layer is pluggable over the graph database layer and the graph database layer is pluggable over the backend database layer to independently change configuration of each layer,
wherein with presence of the object database layer in the multi-layered database, changes in information of the object database layer is automatically incorporated into the nodes and edges in the graph database layer, and the object in the backend database layer,
wherein the object database layer facilitates adding a new real world entity to the graph database layer unaltering the node and the edge.

30. The method of claim 29, wherein the composing includes:
traversing, by the processor, the graph database layer to identify one or more nodes corresponding to the one or more objects, the edges connecting the one or more nodes, and the properties associated with the one or more nodes and the edges;
obtaining, by the processor, the data and the metadata corresponding to the one or more nodes and the edges from the backend database layer; and
compiling, by the processor, the one or more nodes based on the data and the metadata, and the one or more objects based on the one or more nodes to form the composed information.

31. The method of claim 30, wherein the obtaining the data and the metadata corresponding to the one or more nodes comprises searching for the data and the metadata in a plurality of storage media based on a frequency of access of the data and the metadata, wherein the plurality of storage media is selected from a cache memory, an internal storage device, an external storage device, and cloud storage media.

32. The method of claim 29, wherein the identifying the one or more objects includes performing, by the processor, a search based on the query in an index of the graph database layer.

33. The method of claim 32, wherein the index is a segmented index implementing a plurality of indexing techniques.

34. The method of claim 29, wherein the identifying the one or more objects includes performing, by the processor, a non-indexed search on the objects in the object database layer.

35. A non-transitory computer readable medium comprising instructions executable by a processor to perform a method for storing data using a knowledge representation scheme in a multi-layered database, the method comprising:

receiving, by the processor, attributes of a real world entity for storage in the multi-layered database, wherein the attributes characterize properties and relationships of the real world entity;

storing, by the processor, an object corresponding to the real world entity in an object database layer of the multi-layered database, wherein, based on the attributes of the real world entity, the object is associated with object properties that characterize the object, at least one object relationship that relates the object to at least one other object, and relationship properties that characterize the object relation, wherein the object and the at least one object relationship are manipulated independently;

decomposing, by the processor, the object, the object properties, the object relationship, and the relationship properties into a node, node properties associated with the node, at least one edge, and edge properties associated with the edge, wherein the node properties are indicative of the object properties, the edge is indicative of the object relationship, and the edge properties are indicative of the relationship properties of the object;

storing, by the processor, the node, the node properties, the edge, and the edge properties in a graph database layer of the multi-layered database, wherein the edge connects the node with at least one other node corresponding to the at least one other object;

decomposing further, by the processor, the node, the node properties, the edge, and the edge properties into the data and metadata associated with the data; and storing, by the processor, the data and the metadata corresponding to the node of the graph database layer in a backend database layer of the multi-layered database, wherein the backend database layer is scalable in real-time, wherein the backend database layer further store the node properties as the data and store the edge properties as the metadata, wherein the object database layer is pluggable over the graph database layer and the graph database layer is pluggable over the backend database layer to independently change configuration of each layer, wherein with presence of the object database layer in the multi-layered database, changes in information of the object database layer is automatically incorporated into the nodes and edges in the graph database layer, and the object in the backend database layer, wherein the object database layer facilitates adding a new real world entity to the graph database layer unaltering the node and the edge.

36. A non-transitory computer readable medium comprising instructions executable by a processor to perform a method for retrieving information using a knowledge representation scheme in a multi-layered database, the method comprising:

receiving, by the processor, a query from a user to retrieve the information from the multi-layered database;

identifying, by the processor, based on the query, one or more objects in an object database layer of the multi-layered database, wherein the information to be retrieved corresponds to the one or more objects, and wherein each of the one or more the objects is associated with object properties that characterize an object, an object relationship that relates the object to at least one other object, and relationship properties of the object relationship, wherein the object and the object relationship are manipulated independently;

determining, by the processor, access privileges for the user to access the one or more objects, wherein the access privileges are based on user role;

composing, by the processor, the information corresponding to the one or more objects from a graph database layer and a backend database layer when the user is privileged to access the one or more objects, wherein, for each of the one or more objects, the graph database layer includes a node, node properties, edges connecting the node to at least one other node, and edge properties for each of the edges, and wherein, for each node, the backend database layer stores the node properties as data and store the edge properties as metadata, wherein the backend database layer is scalable in real-time; and providing, by the processor, the composed information to the user in response to the query, wherein the object database layer is pluggable over the graph database layer and the graph database layer is pluggable over the backend database layer to independently change configuration of each layer, wherein with presence of the object database layer in the multi-layered database, changes in information of the object database layer is automatically incorporated into the nodes and edges in the graph database layer, and the object in the backend database layer, wherein the object database layer facilitates adding a new real world entity to the graph database layer unaltering the node and the edge.

* * * * *